US009138808B2

(12) United States Patent
Walton et al.

(10) Patent No.: US 9,138,808 B2
(45) Date of Patent: Sep. 22, 2015

(54) TOOL FEED SYSTEM FOR USE WITH A ROTATING MACHINING DEVICE

(71) Applicant: TRI TOOL INC., Rancho Cordova, CA (US)

(72) Inventors: Joel Walton, Rancho Cordova, CA (US); Vinh Hoang, Rancho Cordova, CA (US); Justin Tripp, Rancho Cordova, CA (US); Ashkan Ferozepurwalla, Rancho Cordova, CA (US)

(73) Assignee: Tri Tool Inc., Rancho Cordova, CA (US)

( * ) Notice: Subject to any disclaimer, the term of this patent is extended or adjusted under 35 U.S.C. 154(b) by 13 days.

(21) Appl. No.: 14/516,159

(22) Filed: Oct. 16, 2014

(65) Prior Publication Data
US 2015/0107425 A1 Apr. 23, 2015

Related U.S. Application Data

(60) Provisional application No. 61/892,038, filed on Oct. 17, 2013.

(51) Int. Cl.
*B23B 5/16* (2006.01)
*B23B 3/26* (2006.01)
*B23B 25/00* (2006.01)
*B23B 5/14* (2006.01)

(52) U.S. Cl.
CPC . *B23B 3/26* (2013.01); *B23B 5/163* (2013.01); *B23B 25/00* (2013.01)

(58) Field of Classification Search
CPC .............. B23B 5/16; B23B 5/08; B23B 5/14; B23B 5/161; B23D 21/04; B23D 21/08
USPC .................................................. 82/113, 70.2
See application file for complete search history.

(56) References Cited

U.S. PATENT DOCUMENTS 253,679 A 2/1882 Bussing
560,322 A 5/1896 McGloin
(Continued)

FOREIGN PATENT DOCUMENTS

DE 1 966 974 U 8/1967
WO 2008/052106 A2 5/2008

OTHER PUBLICATIONS

International Search Report and Written Opinion of the International Searching Authority from International Application No. PCT/US2014/060912, Dec. 22, 2014.

(Continued)

*Primary Examiner* — Will Fridie, Jr.
(74) *Attorney, Agent, or Firm* — Workman Nydegger

(57) ABSTRACT

A rotating machining device for machining a work piece includes a support housing adapted to be mounted on the work piece and a headstock rotatably mounted on the support housing. At least one tool module is mounted to the headstock and includes a tool feed system having a tool holder and a feed mechanism operatively connected to the tool holder. A tripper pin assembly is mounted on the support housing and arranged to collide with the feed mechanism for advancement of the tool holder relative to the work piece. The feed mechanism collides with the tripper pin assembly at a collision point radially positioned inside of an outer diameter of the headstock.

19 Claims, 14 Drawing Sheets

(56) References Cited

U.S. PATENT DOCUMENTS

| | | | |
|---|---|---|---|
| 575,618 A | 1/1897 | Schon | |
| 640,397 A | 1/1900 | Merker | |
| 667,684 A | 2/1901 | Deharde | |
| 1,876,914 A | 9/1932 | Gordon | |
| 3,192,001 A | 6/1965 | Karge, Jr. | |
| 3,795,429 A | 3/1974 | Peyrot | |
| 4,418,591 A | 12/1983 | Astle | |
| 4,543,861 A | 10/1985 | Kwech et al. | |
| 4,677,884 A | 7/1987 | Kwech et al. | |
| 4,739,685 A | 4/1988 | Ricci | |
| 4,754,672 A | 7/1988 | VanderPol | |
| 4,939,964 A | 7/1990 | Ricci | |
| 4,944,205 A * | 7/1990 | Ricci | 82/113 |
| 5,368,399 A | 11/1994 | Tremblay | |
| 5,429,021 A | 7/1995 | Astle et al. | |
| 5,549,024 A * | 8/1996 | Ricci | 82/113 |
| 6,038,947 A * | 3/2000 | Tremblay | 82/113 |
| 6,257,110 B1 | 7/2001 | Ricci et al. | |
| 6,615,696 B2 | 9/2003 | Ricci et al. | |
| 7,320,268 B2 | 1/2008 | Kawashima | |
| 7,819,043 B2 * | 10/2010 | Karahalios et al. | 82/1.11 |
| 7,967,511 B2 | 6/2011 | Aida | |
| 8,051,753 B2 | 11/2011 | Ricci et al. | |
| 8,250,953 B2 * | 8/2012 | Hall et al. | 82/113 |
| 2005/0132851 A1 | 6/2005 | Place | |
| 2006/0207395 A1 * | 9/2006 | Place et al. | 82/113 |
| 2010/0162860 A1 | 7/2010 | Hall et al. | |
| 2011/0219920 A1 | 9/2011 | Arnemann | |
| 2011/0314978 A1 | 12/2011 | Phillips, II et al. | |
| 2013/0014937 A1 | 1/2013 | Krohn et al. | |

OTHER PUBLICATIONS

International Search Report and Written Opinion of the International Searching Authority from International Application No. PCT/US2014/059875, Jan. 8, 2015.

* cited by examiner

TOOL FEED SYSTEM FOR USE WITH A ROTATING MACHINING DEVICE

TECHNICAL FIELD

The disclosure relates to a tool feed system for use with a rotating machining device.

BACKGROUND

Clamshell lathes are utilized in industrial settings to machine or cut a portion of a generally cylindrical pipe or tube. These lathes may comprise first and second semicircular halves designed to be joined to surround the pipe to be cut or machined. The resulting annular assembly includes a stationary ring portion that becomes clamped to the pipe and an abutting rotatable portion including a gear ring attached to the stationary ring portion for rotation about the concentrically disclosed pipe.

A drive system including a motor is operatively coupled to the assembly and includes a drive gear designed to mesh with the gear ring operatively connected to the rotatable portion of the lathe. A tool slide can be mounted on the rotatable portion and is adapted to hold a tool bit for milling or cutting the pipe. The tool slide can include a feed mechanism including a tripper pin assembly that advances the tool slide and the tool bit preferably in a radial direction toward the pipe in incremental steps upon a predetermined revolution of the rotatable portion.

Because of the wide range of pipe sizes, the radial position of the tool slide and feed mechanism must be able to accommodate different sizes of pipe. Conventionally, this has been accomplished using a tripper pin assembly and a fixed position tripper sprocket on the tool slide. The tripper pin assembly is mounted on a tower radially protruding from the outer surface of the pipe lathe. When the operator radially repositions the tool slide to accommodate different sized pipes, the operator must also reposition the tripper pin assembly radially on the tower to correspond to the radial position of the tripper sprocket on the tool slide.

While these conventional tool slide and feed mechanisms can accommodate different sizes of pipe, they suffer from several drawbacks. For instance, they can expose the operator to dangerous pinch points between the tripper pin assembly and the tripper sprocket and/or other pinch points associated with the tool slide and feed mechanism as the tool module is rotating around the pipe lathe. A "pinch point" is a point that develops when two parts move together and at least one moves in rotary or circular motion. Such pinch points commonly cause disabling workplace injuries to fingers, hands, and/or arms of operators or other individuals. It is possible to have a hand, fingers, or an arm of an operator caught in the pipe lathe and injured.

Further, every the time the operator repositions the tool slide, the operator must also reposition the tripper pin assembly on the tower, which can be time consuming, inconvenient, and even dangerous if the pipe lathe is inadvertently energized during repositioning of the tripper pin assembly. In addition, the operator is commonly exposed to gear connections between the drive gear and gear ring typically located external to the body of the pipe lathe, creating an additional hazard for the operator that could cause disabling injuries.

SUMMARY

The tool feed system is described in a pipe lathe adaptable to a variety of configurations and has various features. While described in this context, the features may be adapted in other types of rotating machining devices other than the exemplary pipe lathes.

Certain features include tool feed systems, tripper pin assemblies, drive gears, and other contributing features to improve the safety of pipe lathe operators and to reduce the overall profile of the pipe lathe.

Embodiments of the disclosure can include a rotating machining device for machining a work piece having a support housing adapted to be mounted on a work piece and a headstock rotatably mounted on the support housing. At least one tool module can be mounted to the headstock and includes a tool feed system having a tool holder and a feed mechanism operatively connected to the tool holder. A tripper pin assembly is mounted on the support housing and is arranged to collide with the feed mechanism for advancement of the tool holder relative to the work piece.

The tripper pin assembly can collide with the feed mechanism at a collision point radially positioned inside of an outer diameter of the headstock, protecting an operator of the rotating machining device from a pinch point associated with the collision point. This has the effect of limiting or eliminating the risk of the operator or other person getting a finger or hand caught in between the tripper pin assembly and the feed mechanism, making the rotating machining device safer to operate. This is advantageous because the tripper pin assembly of conventional pipe lathes is mounted on a tower radially protruding from the lathe, exposing the operator to dangerous pinch points between the tripper pin assembly and the feed mechanism and other pinch points as the tool module is rotating around the pipe lathe.

According to a variation, the collision point can be within an annular recess formed in the headstock. This is advantageous because the collision point can be maintained in the annular recess even if the position of feed mechanism moves relative to the at least one tool module, allowing the tripper element to be safely fixed and concealed within the annular recess.

According to a variation, the tripper pin assembly can extend axially through the support housing and into the annular recess of the headstock, substantially protecting the tripper pin assembly within the rotating machining device.

According to a variation, the position of the feed mechanism can be adjustable relative to the at least one tool module. This allows the at least one tool module to be repositioned on the headstock while the feed mechanism and collision point are maintained inside of the outer diameter of the headstock. This is advantageous because the operator does not have to reposition the tripper pin assembly on the support housing to form a new collision point when the tool module is repositioned as in the prior art, which can be time consuming, inconvenient, and dangerous.

According to a variation, the rotating machining device can include a gear ring attached to the headstock and a drive gear operatively connected to the gear ring and arranged for rotating the gear ring and the headstock during operation of the rotating machining device. The connection between the gear ring and the drive gear can be radially positioned inside of the outer diameter of the headstock, substantially protecting the operator from a pinch point associated with the connection.

Embodiments of the tool feed system can be arranged such that the location of the collision point is adjustable relative to the at least one tool module and substantially adjacent to the outer diameter of the headstock, reducing the chance of injury to the operator due to a pinch point associated with collision point.

The numerous advantages, features and functions of the embodiments of the bearing assembly will become readily apparent and better understood in view of the following description and accompanying drawings. The following description is not intended to limit the tool feed system, but instead merely provides exemplary embodiments for ease of understanding.

BRIEF DESCRIPTION OF THE DRAWINGS

These and other features, aspects, and advantages of the present disclosure will become better understood regarding the following description, appended claims, and accompanying drawings.

DETAILED DESCRIPTION OF VARIOUS EMBODIMENTS

Figure 1:
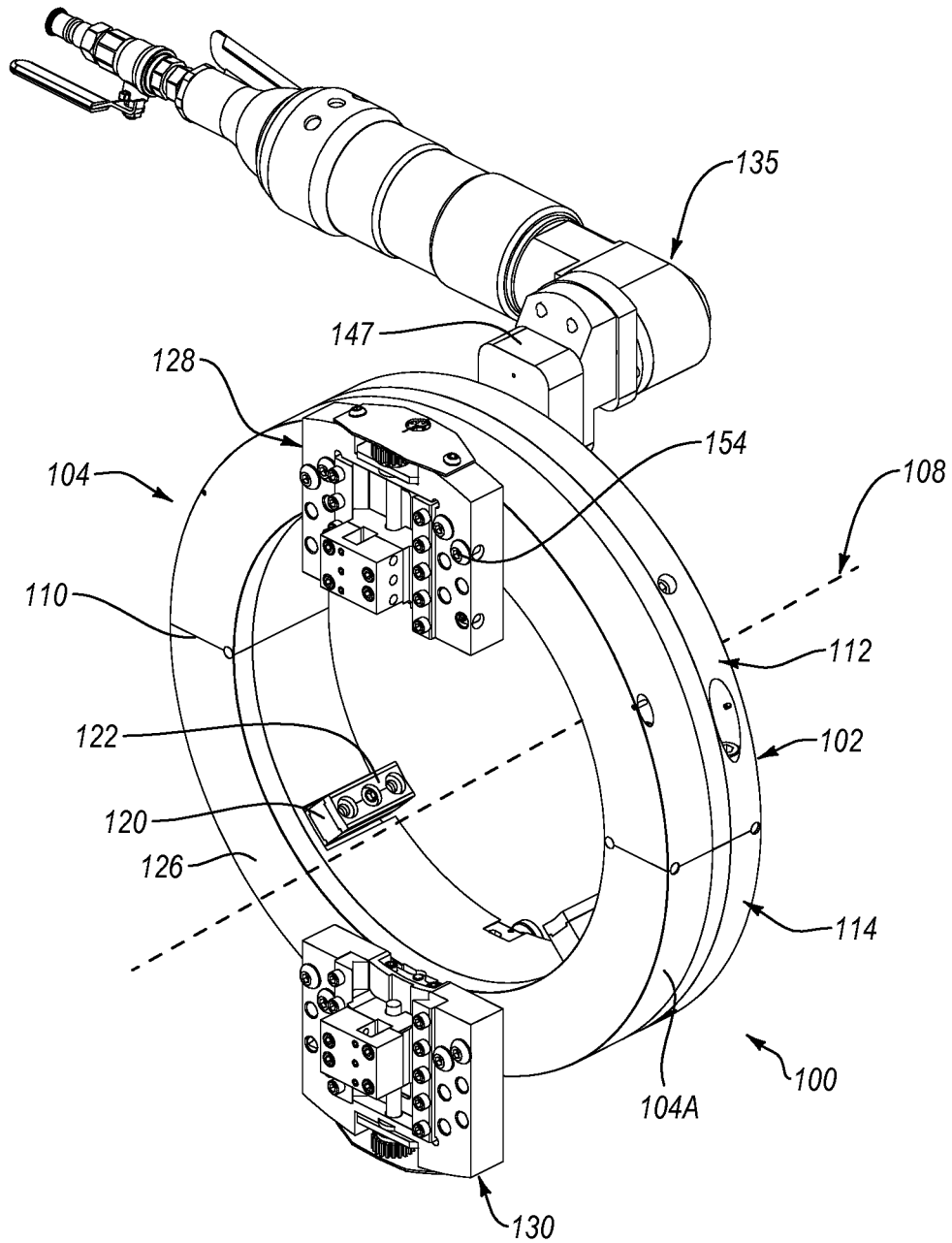
FIG. 1 is a front isometric view of a pipe lathe according to an embodiment.

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and described below. It should be understood, however, there is no intention to limit the disclosure to the embodiments disclosed, but on the contrary, that the intention covers all modifications, alternative constructions, combinations, and equivalents falling within the spirit and scope of the disclosure.

A first exemplary embodiment of a rotating machining device comprising a pipe lathe 100 is shown in FIG. 1. The pipe lathe 100 includes a support housing 102, a headstock 104, one or more bearing assemblies 106 (shown in FIG. 7) that rotatably mount the headstock 104 to the support housing 102, and a drive module 135 and gear box 147 operatively connected to the headstock 104 to rotate the headstock 104. Both the support housing 102 and the headstock 104 can be segmented (e.g. split into two or more pieces) and designed to be coupled together to form a complete assembly around a work piece (e.g., a pipe) to be machined.

The work piece is supported concentrically by the pipe lathe 100 relative to an axis of rotation 108 of the headstock 104. The pipe lathe 100 can be split diametrically along line 110 with two semicircular halves that are removably fastened. While the pipe lathe 100 is shown including two halves, the pipe lathe 100 can be constructed as four or any other suitable number of segments that may be joined around the work piece. While the pipe lathe 100 is described being mounted on the exterior perimeter of the work piece, in other embodiments, the pipe lathe 100 can be employed on the interior circumference or perimeter of the work piece. It will also be appreciated that while the pipe lathe 100 is shown having a generally circular shape, the pipe lathe 100 may have an oval shape, a tapered shape, combinations thereof, or any other suitable shape The support housing 102 can be a generally annular member adapted to be concentrically clamped about the work piece. The support housing 102 can include two segments 112, 114 (shown in FIG. 1) that are removably coupled together. The first segment 112, which is shown and described as a first half 112 of the support housing 102, can be structured to extend around or within a first portion of the perimeter of the work piece. The second segment 114, which is shown and described as a second half 114 of the support housing 102, can be structured to extend around or within a second portion of the perimeter of the work piece.

The support housing 102 can include a back side 116 (FIG. 8) and a front side 118 disposed opposite the back side 116 of the support housing 102. For proper centering, a plurality of spacers 120 (e.g., feet or pads) can be positioned about the inner interior wall surface of the support housing 102 and held in place by bolts 122.

It will be appreciated that the support housing 102 can exhibit any suitable configuration. For instance, while the support housing 102 is shown comprising two halves, the support housing 102 can be constructed as three, four, or any suitable number of segments that may be joined about the work piece. The support housing 102 can be formed of any suitable material. The support housing 102 can include aluminum or other suitable metals.

The headstock 104 can be mounted for rotation about axis 108 on the support housing 102. The headstock 104 can include a back side 124 (FIG. 7), which faces the front side 118 of the support housing 102, and a front side 126 disposed opposite the back side 124 of the headstock 104. The back side 124 the headstock 104 also can provide a support area for a gear ring described below. The headstock 104 can be formed of medium-carbon alloy steel, carbon steel, stainless steel, tungsten carbide, combinations thereof, or another suitable material. The headstock 104 can exhibit any suitable configuration.

Two tool modules 128, 130 can be mounted on the front side 126 of the headstock 104. Each tool module 128, 130 can be arranged to selectively mount several tool bits for cutting or machining (e.g., beveling, grooving, and/or other operations) the work piece. In the illustrated embodiment, the tool modules 128, 130 are disposed on opposite sides (e.g., diametrically opposite sides) of the headstock 104. Such a configuration can help create a neutral cutting force, whereby binding or twisting of the pipe lathe 100 can be avoided or minimized. While two tool modules are described and illustrated, it will be appreciated that the pipe lathe 100 can include any suitable number of tool modules.

At least one of the tool modules 128, 130 include a tool feed system 181 that causes advancement of the tool module towards or away from the surface of the work piece while eliminating or limiting pinch points. The tool feed system 181 can exhibit any suitable configuration. For simplicity of illustration and economy of disclosure, only one tool module 128 will be described. It will be appreciated, however, that the other tool module 130 may be substantially similar to or different than the tool module 128. For instance, the tool module 130 can have a lower profile module than the tool module 128. By way of another example, the tool module 128 may be radially adjustable as described below and the tool module 130 may not be radially adjustable.

Figure 2:
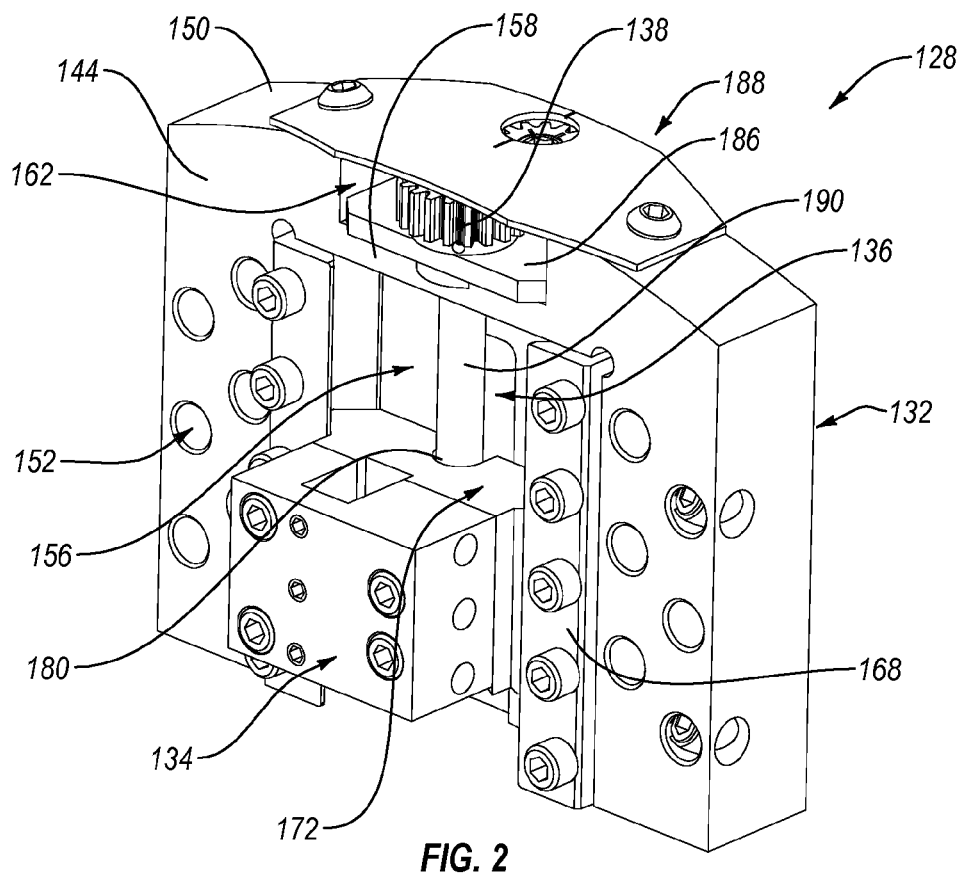
FIG. 2 is a front isometric view of a tool module removed from the pipe lathe in FIG. 1.
Figure 3:
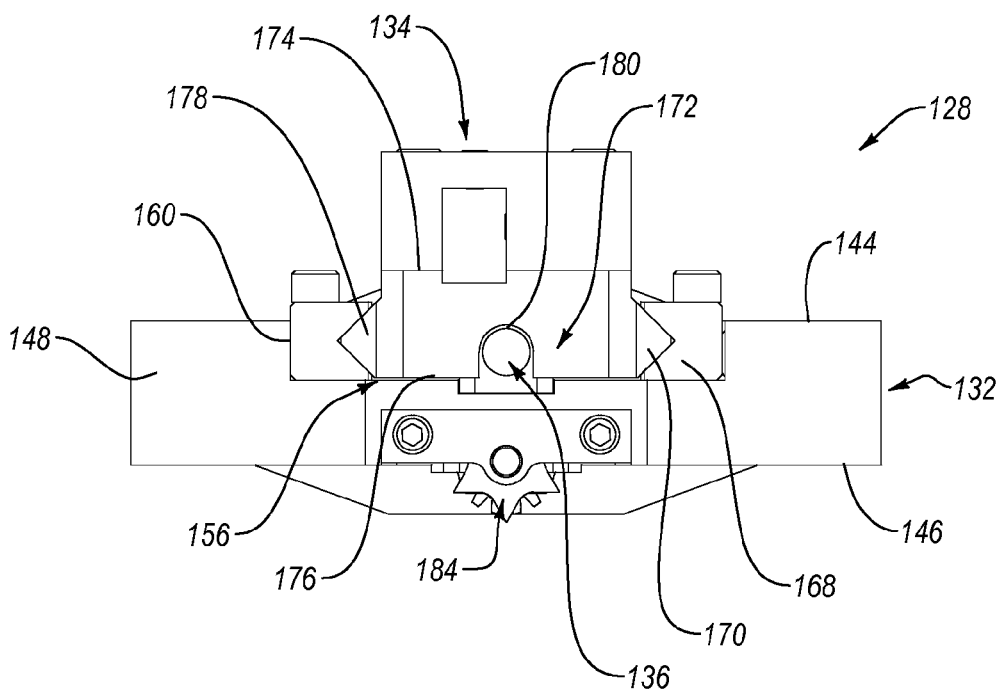
FIG. 3 is a bottom view of the tool module in FIG. 2.

FIGS. 2-5 illustrate the tool module 128 removed from the pipe lathe 100 for ease of reference. As seen in FIGS. 2 and 3, the tool module 128 can include a block member 132. The block member 132 can include a planar front side 144 and a generally planar back side 146 disposed opposite the front side 144 of the block member 132. The back side 146 of the block member 132 is faced the front side 126 of the headstock 104. The block member also can include a planar bottom side 148 and a curved top side 150 disposed opposite the bottom side 148 of the block member 132.

The block member 132 can include a plurality of apertures 152 for receiving a plurality of fasteners 154 (shown in FIG. 1) to fasten the block member 132 to the headstock 104. The apertures 152 can be patterned in the block member 132 such that the radial position of the tool module 128 including a tool holder 134 can be adjusted relative to the axis 108 by inserting the fasteners 154 in different ones of the apertures 152. It will be appreciated that the block member 132 can include any suitable number and/or pattern of apertures. As discussed in more detail below, the position of the tool module 128 can be adjustable while keeping the tool feed system of the tool module 128 engaged with a tripper pin positioned under the tool block.

The front side 144 of the block member 132 can include a front cavity 156 defined by a top wall 158 and a pair of sidewalls 160 extending between the top wall 158 and the bottom side 148 of the block member 132. A cutout 162 (FIG. 4) can be formed in the top side 150 of the block member 132. The cutout 162 can be at least partially defined by a bottom wall 164 and a pair of side walls 166 extending between the bottom wall 164 and the top side 150.

A through-hole 161 (FIG. 5) can extend through the bottom wall 164 of the cutout 162 into the front cavity 156. A top support bracket 186 can be positioned in the cutout 162 that includes a first hole aligned with the through-hole extending through the bottom wall 164 of the cutout 162 and a second hole generally aligned with a slot described below.

As best seen in FIGS. 2 and 3, a pair of guides 168 including grooves 170 facing one another can be removably mounted in the front cavity 156 of the block member 132. The grooves 170 can exhibit any suitable configuration. The grooves 170 have a V-shaped cross-section. In other embodiments, the grooves 170 can be angular, trapezoidal, curved, combinations thereof, or any other suitable shape.

A base member 172 can be slidably positioned between the guides 168. The base member 172 can include a front side 174, a back side 176, and opposite sidewalls 178 extending between the front side 174 and the back side 176. The sidewalls 178 can be arranged to correspond to the grooves 170 in the guides 168. Engagement between the sidewalls 178 and the grooves 170 in the guides 168 can create a sliding contact surface that permits the base member 172 to travel up and down between the guides 168.

The base member 172 can include a longitudinal groove 180 extending along the back side 176 of the base member 172 between the top and bottom of the base member 172. The longitudinal groove 180 is arranged to slidably receive a feed screw described below. The base member 172 can include a slot 182 (shown in FIG. 5) that traverses the longitudinal groove 180. The slot 182 is arranged to at least partially receive a feed nut described below.

A tool holder 134 can be removably attached to the front side 174 of the base member 172. The tool holder 134 is moved with the base member 172 in the radial direction relative to the work piece and includes an opening to receive and securely hold a tool bit (not shown).

A feed screw 136 can be at least partially in the cutout 162 and the front cavity 156 of the block member 132. The feed screw 136 includes a shaft portion 190 and a first connecting gear 138 including teeth. The shaft portion 190 extends through the longitudinal groove 180 of the base member 172. The first connecting gear 138 can be fixedly connected to the shaft portion of the first connecting gear 138. The first connecting gear 138 can be positioned within the cutout 162 of the block member 132 and over the bracket 186. At least a portion of the shaft portion 190 can be threaded.

Optionally, the feed screw 136 can include a flange or collar portion 194 positioned between the bracket 186 and the bottom wall 164 of the cutout 162. The collar portion 194 can be configured to help maintain the position of the feed screw 136 relative to the block member 132.

Figure 4:
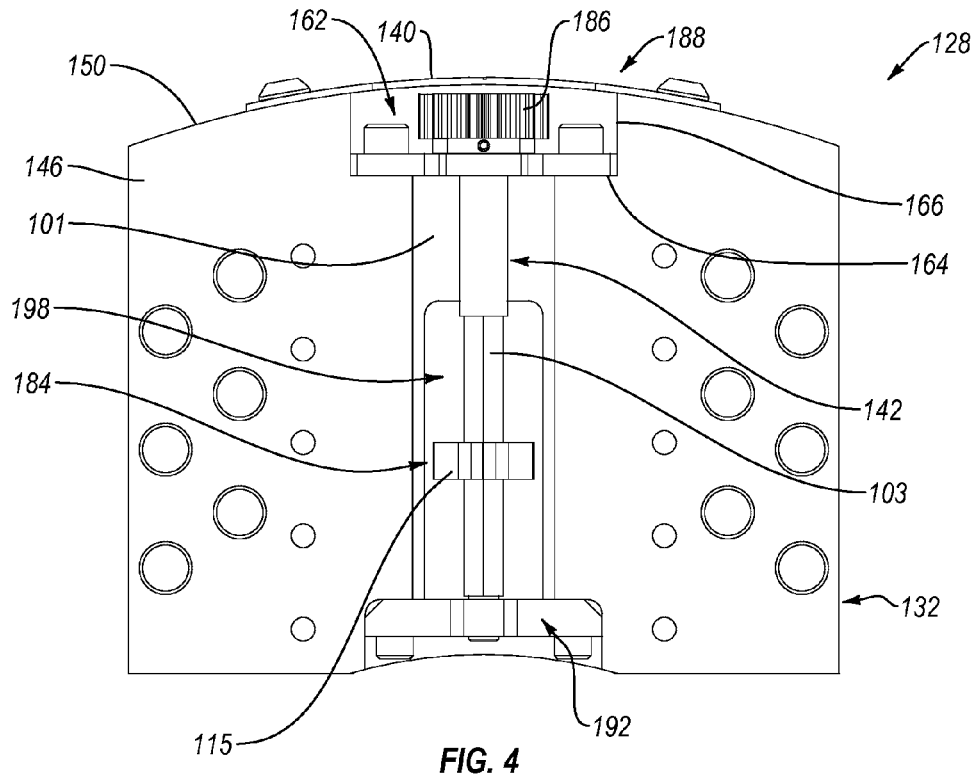
FIG. 4 is a back view of the tool module in FIG. 2.
Figure 5:
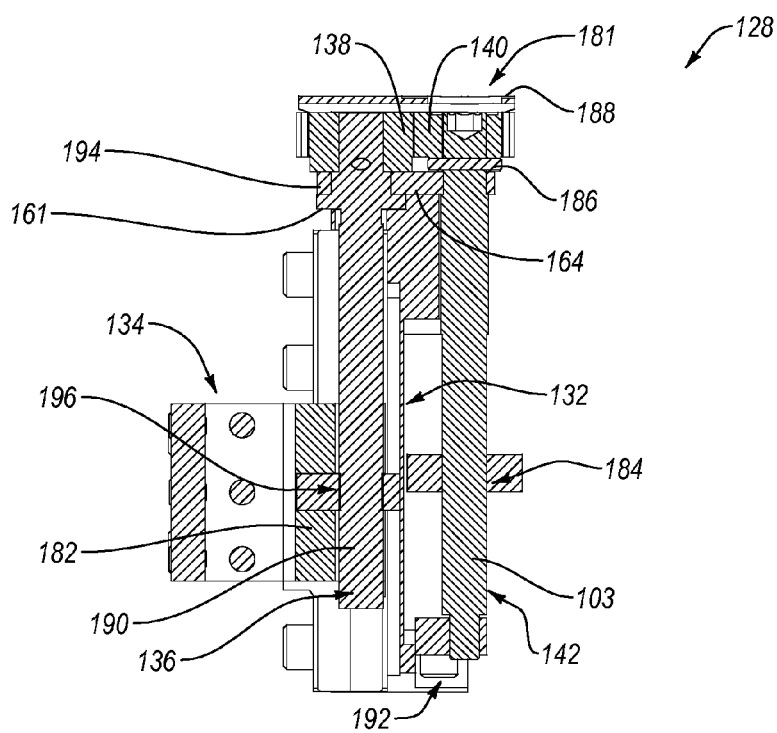
FIG. 5 is a cross-sectional view of the tool module in FIG. 2.

Referring to FIGS. 4 and 5, a feed nut 196 runs along the feed screw 136 and is operatively coupled to the tool holder 134 so rotation of the feed screw 136 results in radial or up and down translation of the tool holder 134. The feed nut 196 can be threadedly attached to the shaft portion 190 of the feed screw 136 and adapted to ride up and down on the threads of the shaft portion 190 when the feed screw 136 rotates.

The feed nut 196 can be at least partially received within the slot 182 on the back of the base member 172. The connection is formed between the base member 172 and an upper and/or lower surface area of the feed nut 196 such that rotation of the feed screw 136 causes the feed nut 196 to ride up and down on the threads of the shaft portion 190, which moves the base member 172 and tool holder 134 up and down within the front cavity 156.

The connection between the feed nut 196 and the base member 172 can be internalized. This connection or potential pinch point is safely positioned under the base member 172 removing a potentially dangerous pinch point found in the tool feeding systems of conventional tool modules.

The back side 146 of the block member 132 can include a back cavity 198 and a slot 101 extending between the back cavity 198 and the cutout 162 in the top side 150 of the block member 132. A tripper shaft 142 can be positioned in the cutout 162, the back cavity 198, and the slot 101 of the block member 132. The tripper shaft 142 can include a shaft portion 103 and a second connecting gear 140 including teeth. The shaft portion 103 can extend through the second hole in the top support bracket 186 and can be at least partially positioned with the slot 101 and the back cavity 198.

The second connecting gear 140 can be attached to the shaft portion 103 and positioned in the cutout 162 in the top side 150 of the block member 132. The teeth of the second connecting gear 140 are interacted or mesh with the teeth of the first connecting gear 138 on the feed screw 136. Rotation of the tripper shaft 142 rotates the second connecting gear 140, which rotates the first connecting gear 138, which rotates the feed screw 136.

A gear cover 188 can be attached to the top side 150 of the block member 132. The gear cover 188 can be positioned over the first connecting gear 138 and the second connecting gear 140. The first connecting gear 138 and the second connecting gear 140 can be internalized or positioned under the gear cover 188, removing or limiting exposure to the pinch point associated with the interaction between the first connecting gear 138 and the second connecting gear 140. This has the effect of preventing a finger or hand from being caught in between the first connecting gear 138 and the second connecting gear 140, increasing operator safety.

Optionally, the gear cover 188 can include an aperture aligned with a slot formed in the top of the second connecting gear 140. The slot can be configured to receive a tool member (e.g., a hex-wrench) such that an operator can insert a tool member in the slot to manually rotate the tripper shaft 142 as desired.

A feed mechanism 184 comprising a tripper sprocket including teeth 115 can be arranged to cooperate with a fixed tripper pin (described below) to cause advancement of the tool holder 134 towards or away from the surface of the work piece when the headstock 104 is rotated relative to the support housing 102. A bore in the tripper sprocket 184 can be arranged to substantially match the shape of at least a portion of the shaft portion 103 of the tripper shaft 142, which in the illustrated embodiment is square shaped. While the bore in the tripper sprocket 184 is described having a square shape, the bore can have a hexagonal shape, an oval shape, a triangular shape, combinations thereof, or any other suitable shape.

The position of the tripper sprocket 184 along the shaft portion 103 can be adjustable since the tripper sprocket 184 is arranged to slide on the shaft portion 103. No matter where the tripper sprocket 184 is on the axis of the shaft portion 103, the bore of the tripper sprocket 184 can mate with the shaft portion 103 and rotate the tripper shaft 142 when the tripper sprocket 184 rotates.

As discussed in more detail below, a contact point between a tripper pin described below and the tripper sprocket 184 can be maintained even as the tripper sprocket 184 floats up and down on the tripper shaft 142 with radial adjustments of the tool module 128 or tool module 130. To adjust the position of the tool module 128 for a smaller work piece or pipe, the fasteners 154 (shown in FIG. 1) can be removed from the block member 132 to detach the tool module 128 from the headstock 104 and the tool module 128 can be moved radially inward relative to the work piece.

As the tool module 128 is adjusted radially, the position of the tripper sprocket 184 can be maintained within a recess formed in the headstock 104 described below as the tripper sprocket 184 moves along the tripper shaft 142 until the tool module 128 is in a desired position and re-attached to the headstock 104 via the fasteners 154. Further, this allows the location of a collision point between the tripper sprocket 184 and a tripper pin described below to be repositioned relative to the tool module 128 rather than being fixed relative to the tool module as in the prior art, facilitating adjustment of the collision point to better protect an operator from a pinch point associated with the collision point.

A bottom support bracket 192 can be attached to the block member 132 within a bracket slot. The bottom support bracket 192 can be arranged to help retain the tripper sprocket 184 on the tripper shaft 142.

Figure 6:
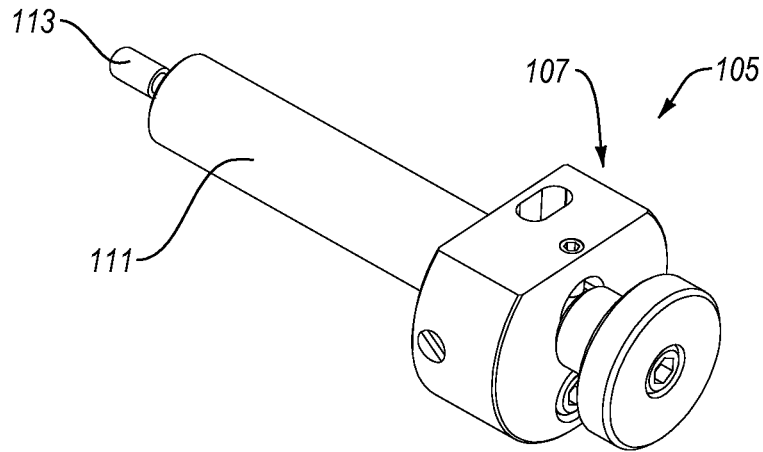
FIG. 6 is an isometric view of a tripper pin assembly removed from the pipe lathe in FIG. 1.

A tripper pin assembly 105 can be arranged to interact with the tripper sprocket 184. FIG. 6 illustrates the tripper pin assembly 105 removed from the pipe lathe 100 for ease of reference. The tripper pin assembly 105 can include a tripper housing 107 having a mounting portion 109 and a shaft portion 111. The tripper pin assembly 105 can include a tripper element 113 comprising tripper pin mounted to the tripper housing 107. The tripper pin 113 can be provided a fixed impact or contact point between the tripper sprocket 184 and the tripper pin 113 such that upon each complete revolution of the tool module 128, the tripper pin 113 engages a tooth on the tripper sprocket 184 to rotate the tripper sprocket 184 a fraction of a turn, causing rotation of the tripper shaft 142. The tripper pin 113 can be removably mounted in the tripper housing 107 such that the tripper pin 113 can be removed from the tripper housing 107 for replacement and/or repair.

Figure 7:
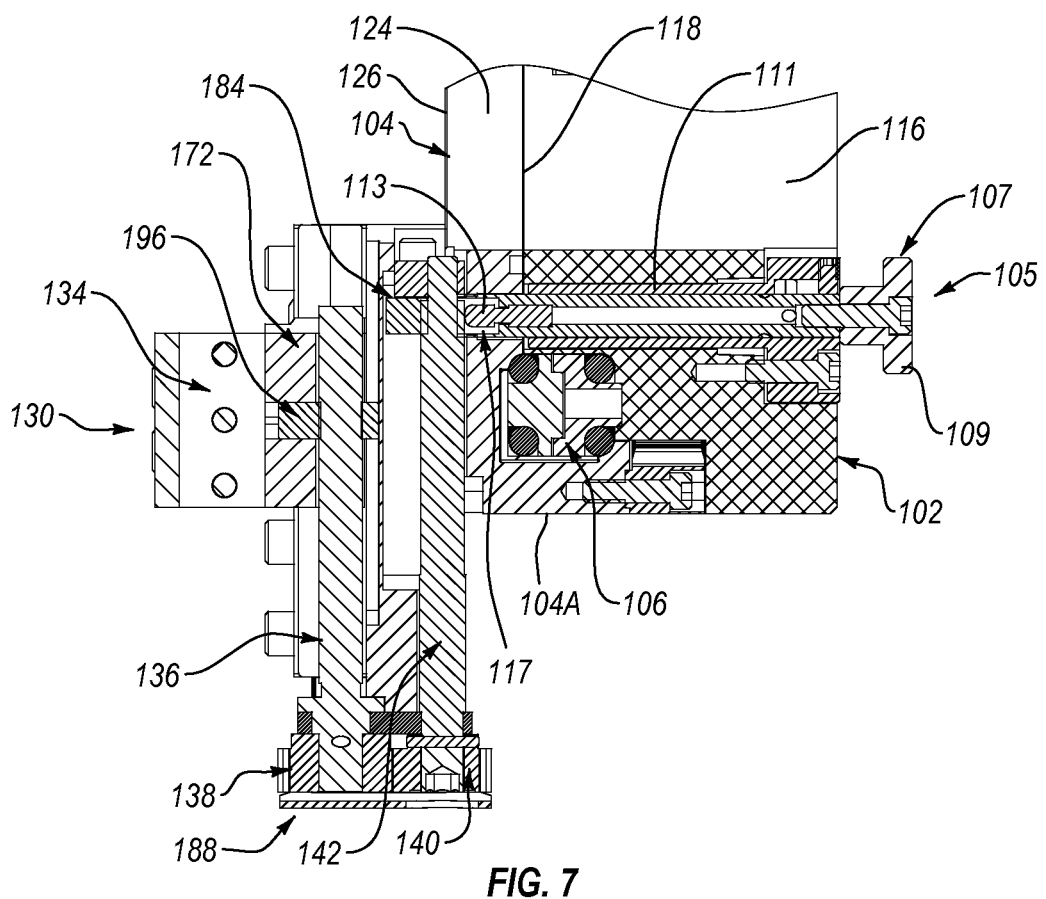
FIG. 7 is a partial cross-sectional view of the pipe lathe in FIG. 1.

As seen in FIG. 7, the tripper pin assembly 105 can be mounted in the support housing 102 of the pipe lathe 100. The tripper pin assembly 105 can be mounted to the support housing 102 in any suitable manner. The tripper pin assembly 105 can extend axially from the back side 116 of the support housing 102 to the headstock 104 such that the tripper pin assembly 105 is positioned and configured to actuate the tripper sprocket 184 or another suitable feed mechanism.

Figure 8:
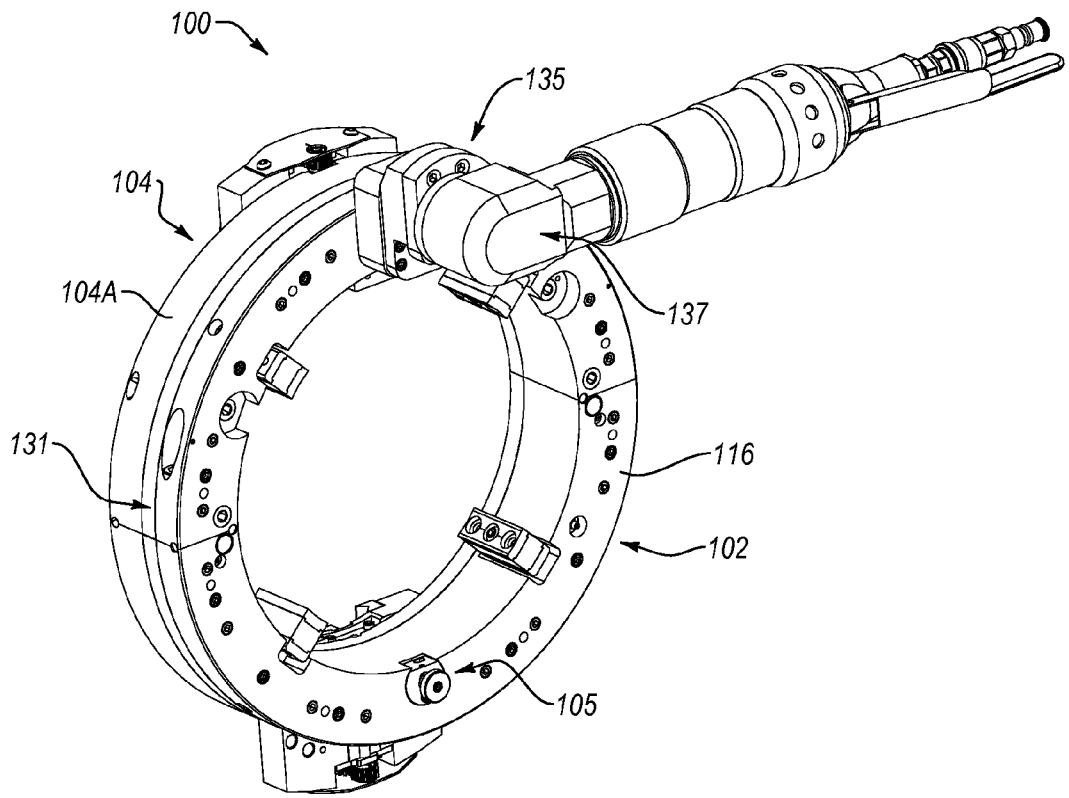
FIG. 8 is a back isometric view of the pipe lathe in FIG. 1.

The support housing 102 can include one or more bores (not shown) extending therethrough that are arranged for mounting the tripper pin assembly 105 inside the pipe lathe 100. Referring briefly to FIG. 8, one or more tripper pin assemblies 105 can be inserted into one or more of the bores such that the one or more tipper pin assemblies 105 extend generally axially between the back side 116 of the support housing 102 and the headstock 104.

The mounting portion 109 of the tripper housing 107 can be received within a countersunk portion of the bore. The shaft portion 111 of the tripper housing 107 can extend through the bore toward the front side 118 of the support housing 102 such that a portion of the tripper pin 113 protrudes beyond the front side 118 of the support housing 102 toward the headstock 104. The position of the tripper pin 113 is such that the tripper pin 113 can strike the tripper sprocket 184 as the tool module 128 orbits around the axis 108 (shown in FIG. 1).

Because the tripper pin assembly 105 is positioned within the bore in the support housing 102, the tripper pin assembly 105 can be substantially concealed within the body or envelope of the pipe lathe 100. The body of the pipe lathe 100 can protect the tripper pin assembly 105 from accidental contact by an operator that could injure the operator or inadvertently damage the tripper pin 113. The tripper pin assembly 105 can be fastened to the support housing 102 via a plurality of fasteners (not shown) that extend through apertures in the mounting portion 109 of the tripper housing 107 and the countersunk portion of the bore.

An annular recess 117 can be formed in the back side 124 of the headstock 104 that is configured to accommodate a portion of the tripper sprocket 184 and the portion of the tripper pin 113 extending beyond the front side of the support housing 102. The recess 117 can comprise an annular groove in the back side 124 of the headstock 104 bound by a pair of sidewalls, a top wall extending between the sidewalls, and the front side 118 of the support housing 102.

When the tool module 128 is mounted on the headstock 104, the collision or contact point between the tripper sprocket 184 and the tripper pin 113 can be located or maintained within the recess 117. Because this contact point is internalized or safely radially positioned inside of the outer diameter 104A (shown in FIGS. 1 and 7) of the headstock 104 or within the envelope of the pipe lathe 100, the pipe lathe 100 can protect the operator from a potentially dangerous pinch point associated with contact point. The risk of an operator or other person getting a finger or hand caught in between the tripper pin 113 and the tripper sprocket 184 is limited or eliminated, making the pipe lathe 100 safer to operate.

Further, the collision or contact point between the tripper pin 113 and the tripper sprocket 184 can be maintained in the recess 117 even as the tripper sprocket 184 floats up and down on the tripper shaft 142 with radial adjustments of the tool module 128 or tool module 130. The position of the tripper pin 113 can be fixed and concealed within the recess 117. In contrast to conventional pipe lathes that require radial adjustment of both the tool module and the tripper assembly on a tripper tower to maintain the contact point between the tripper pin and the tripper sprocket, the position of the tool module 128 or 130 can be adjusted radially relative to a fixed position tripper pin 113 safely positioned within the pipe lathe 100.

The operation of the tool module 130 according to an embodiment will now be described. Upon each complete revolution of the tool module 130, the tripper pin 113 engages a tooth on the tripper sprocket 184 within the recess 117 to rotate the tripper sprocket 184 a fraction of a turn, causing rotation of the tripper shaft 142. The tripper pin 113 strikes the tripper sprocket 184 radially inside of the outer diameter 104A of the headstock 104. For instance, the tripper pin 113 can strike the tripper sprocket 184 inside of the headstock 104 such that the headstock 104 protects the operator from a pinch point associated with the collision point or interaction between the tripper pin 113 and the tripper sprocket 184. The risk or threat of an operator getting a hand or finger injured at the contact point of the tripper pin 113 and the tripper socket 184 is removed.

The tripper sprocket 184 can include six teeth 115 circumferentially distributed about the tripper sprocket 184. The tripper sprocket 184 is configured such that every time the tripper pin 113 strikes the tripper sprocket 184, the tripper sprocket 184 rotates one tooth 115 or about sixty (60) degrees (e.g., 360 degrees divided by 6 teeth). The tripper sprocket 184 can include many suitable teeth and/or be configured to rotate any suitable number of degrees per contact with the tripper pin 113. The tripper sprocket 184 can be configured to rotate between about 20 degrees and about 180 degrees, about 30 degrees and about 120 degrees, about 36 degrees and about 90 degrees, or about 45 degrees and about 60 degrees.

While in the illustrated embodiment one tripper assembly 105 is shown, in other embodiments, the pipe lathe 100 can include two, three, or any other suitable number of tripper assemblies. In an embodiment, the pipe lathe 100 can include two tripper assemblies diametrically opposed on the support housing 102 such that every time the tool module 128 and/or tool module 130 completes a revolution about the axis 108 or work piece, the tripper sprocket 184 rotates two teeth 115 as it will advance and strike one tripper pin and then hit another tripper pin.

The tripper shaft 142 is attached to the second connecting gear 140 so rotation of the tripper shaft 142 causes rotation of the second connecting gear 140. The second connecting gear 140 meshes with the first connecting gear 138 so rotation of the second connecting gear 140 causes rotation of the first connecting gear 138. The gear cover 188 is positioned over the first connecting gear 138 and the second connecting gear 140, eliminating a potentially dangerous pinch point between the first connecting gear 138 and the second connecting gear 140. The first connecting gear 138 is attached to the feed screw 136 so rotation of the first connecting gear 138 causes rotation of the feed screw 136.

The feed screw 136 is threadedly attached to the feed nut 196 so rotation of the feed screw 136 causes the feed nut 196 to advance up and down along the feed screw 136. The interaction between the feed screw 136 and the feed nut 196 is below the base member 172, eliminating or limiting exposure to a potentially dangerous pinch point between the feed screw 136 and the feed nut 196.

The feed nut 196 is operatively coupled to the tool holder 134 so rotation of the feed screw 136 results in radial movement (e.g., up and down translation) of the tool holder 134. The movement of the tool holder 134 moves the tool bit (not shown) radially deeper into the work piece about which the tool bit is orbiting. The pipe lathe 100 can be substantially or completely free of pinch points associated with the tool feed systems of the tool modules 128 and/or 130.

Optionally, the pipe lathe 100 can include one or more pull-away rotation safety features. The fasteners coupling the segments of the headstock 104, the adjustment fasteners or screws of the tool modules 128, 130, the fasteners retaining the tool bits, and/or other hardware can be arranged such that if the headstock 104 became inadvertently energized, rotation of the headstock 104 would move such hardware away from the operator reducing the chance of injury to the operator due to being caught between rotating elements and any external obstructions when using hand tools at these locations.

Figure 9:
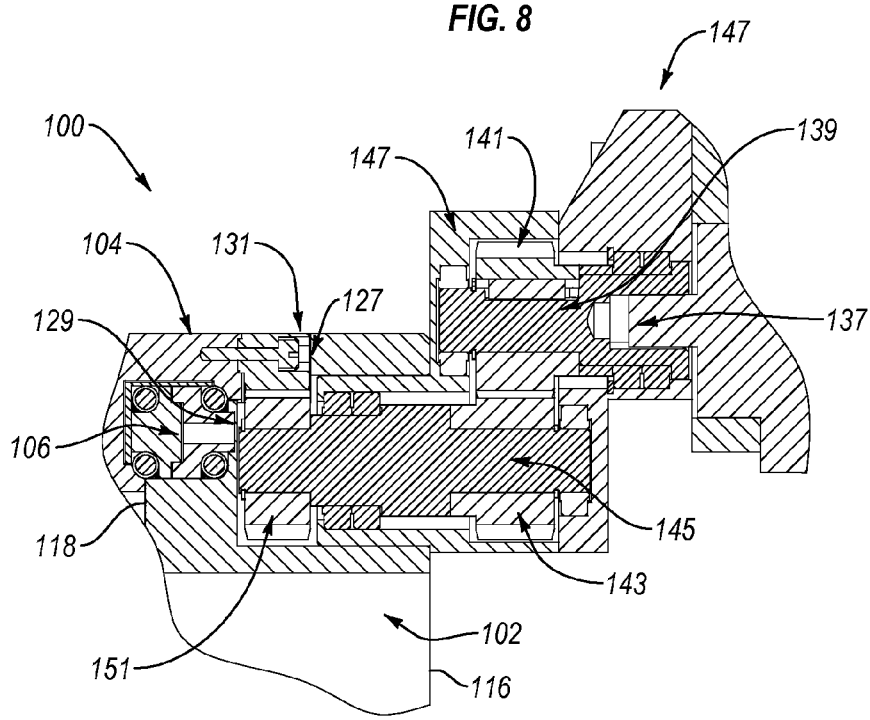
FIG. 9 is another partial cross-sectional view of the pipe lathe in FIG. 1 showing a drive gear assembly according to an embodiment.

The pipe lathe 100 can include one or more features to help enhance safety by eliminating or limiting pinch points associated with a drive system of the pipe lathe. As seen in FIGS. 8 and 9, the back side 116 of the support housing 102 can include an outer annular shoulder 127 that provides a space and support area for a gear ring described below. The front side 118 of the support housing 102 can include an inner annular shoulder 129 that provides a space and support area for the bearing assemblies 106.

A separate gear ring 131 can be fastened to the back side 124 of the headstock 104. The gear ring 131 can include a plurality of teeth, the teeth being formed on an inner radial surface of the gear ring 131. While the teeth are described being on the inner radial surface of the gear ring 131, it will be appreciated that the teeth can be formed on the outer radial surface, the inner radial surface, the top surface, the bottom surface, combinations thereof, or any other surface(s) suitable to cooperate with the drive gear described below.

The gear ring 131 can include a plurality of apertures arranged for receiving a plurality of fasteners to fasten the gear ring 131 to the headstock 104. The gear ring 131 rotates with the headstock 104, but not independently with respect thereto. It will be appreciated that the gear ring 131 can include a plurality of segments. In the illustrated embodiment, the gear ring 131 includes a first segment and a second segment, although it should be appreciated that it could have three or more segments (not shown). While the gear ring 131 is shown and described as being separate from the headstock 104, in other embodiments, the gear ring 131 may be integral to the headstock 104.

The gear ring 131 can be operatively connected to a drive module 135 that rotates the gear ring 131 and the headstock 104 during operation of the pipe lathe 100. The drive module 135 can include a drive motor 137, a first drive shaft 139, a first connecting gear 141, a second connecting gear 143, a second drive shaft 145, and a drive gear 151. The drive motor 137 may be air driven, hydraulically driven, or electrically driven. The drive motor 137 can be mounted to the support housing 102 such that the drive motor 137 forms a right-angle point of entry relative to the back side 116 of the support housing 102.

The drive motor 137 can be mounted to the support housing 102 such that the drive motor 137 forms a non-right angle relative to the back side 116 of the support housing 102. The drive motor 137 can be pivotally mounted on the support housing 102 such that the point of entry of the drive motor 137 relative to the back side 116 can vary along a pre-selected arc (e.g., between about 45 degrees and about 90 degrees). This can facilitate mounting the pipe lathe 100 and/or drive motor 137 in restrictive mounting environments.

The drive motor 137 can be attached to the first drive shaft 139 positioned within a gear box or housing 147. Operation of the drive motor 137 causes rotation of the first drive shaft 139. The first drive shaft 139 can be attached to the first connecting gear 141. The first connecting gear 141 can include a plurality of teeth also within the housing 147 and arranged to interact with the first drive shaft 139 such that rotation of the first drive shaft 139 causes rotation of the first connecting gear 141.

The second connecting gear 143 includes a plurality of teeth arranged to interact or mesh with the teeth of the first drive connecting gear. Rotation of the first drive shaft 139 rotates the first connecting gear 141, which rotates the second connecting gear 143. The second connecting gear 143 can be attached to the second drive shaft 145, which extends parallel the first drive shaft 139 and into a mounting bore formed in the support housing 102.

Both of the second drive shaft 145 and the second connecting gear 143 can be located inside of one or more portions of the housing 147. Further, the interaction between the first connecting gear 141 and the second connecting gear 143 can be within the housing 147. The safety of the pipe lathe 100 can be enhanced because any pinch point associated with the first and second drive connecting gears is limited or eliminated. The risk of the operator injuring a hand or fingers is reduced.

A mounting bore in the support housing 102 can extend between the back side 116 of the support housing 102 and a point below the inner annular shoulder 129 of the support housing 102. The drive gear 151 can include a plurality of teeth and can be attached to the second drive shaft 145 within the support housing 102. The support housing 102 can include an opening formed in a sidewall portion extending upward from the outer annular shoulder 127 in communication with the mounting bore.

At least a portion of the teeth of the drive gear 151 can extend through the opening such that the teeth of the drive gear 151 can be positioned and configured to interact or mesh with the teeth of the gear ring 131. Rotation of the first drive shaft 139 rotates the first connecting gear 141, which rotates the second connecting gear 143, which rotates the second drive shaft 145, which rotates the drive gear 151, which rotates the gear ring 131, which rotates the headstock 104.

As seen in FIG. 9, the gear connections of the pipe lathe 100 can be situated inside of the pipe lathe 100 or the housing 147. Potential pinch points between the respective gear connections of the drive module 135 and the head stock 104 are inside of the pipe lathe 100 where an operator is not in danger of injuring a hand or fingers between the drive gear 151 and the gear ring 131. Such a configuration is in contrast to conventional pipe lathes where such gear connections are dangerously and awkwardly exposed outside of the support housing 102 and/or headstock 104.

Because the drive gear 151 is mounted inside the pipe lathe 100 or on the back side 116 of the support housing 102 and the tool feed systems of the tool modules 128, 130 are located inside or substantially adjacent an outer surface of the pipe lathe 100 or on the front side 126 of the headstock 104, substantially the entire outer diameter 104A (shown in FIG. 1) of the pipe lathe 100 can be relatively free of pinch points or other obstacles that could injure an operator, improving operator safety. Because there are little or no obstructions associated with the outer diameter 104A of the headstock 104, potential pinch points between such obstructions and the tool modules are eliminated or reduced.

The pipe lathe 100 can include any suitable drive module 135 and/or gear ring 131. For example the drive module 135 can include bevel gear sets, straight cut miter gear sets, skew bevel gears, helical gear sets, spiral bevel gear set, combinations thereof, or any other suitable gear configuration.

Figure 10:
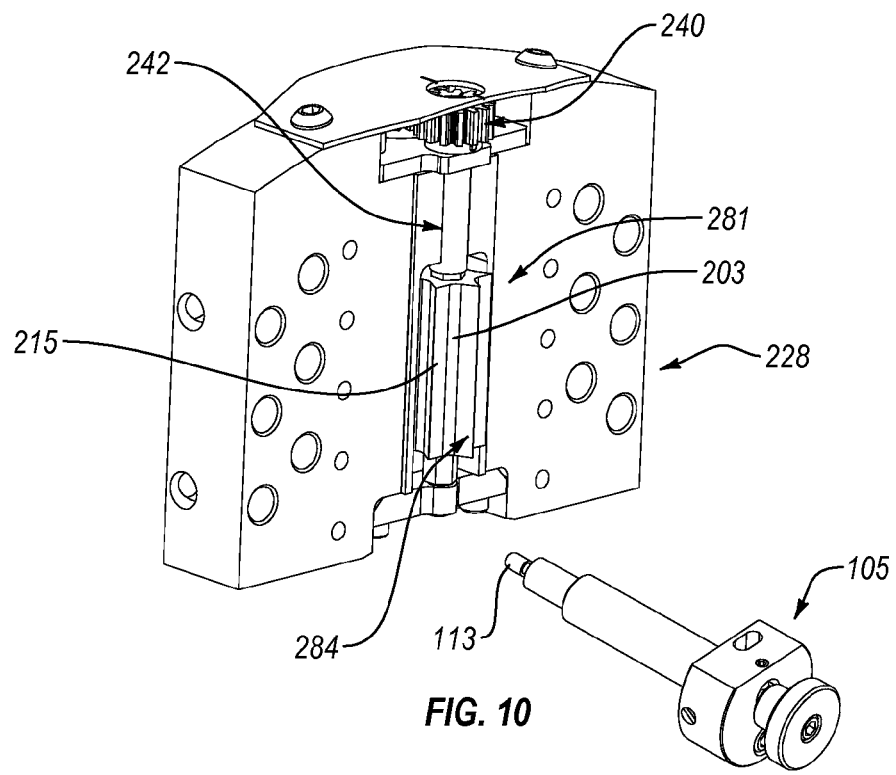
FIG. 10 is a front isometric view of a tool module according to another embodiment.
Figure 11:
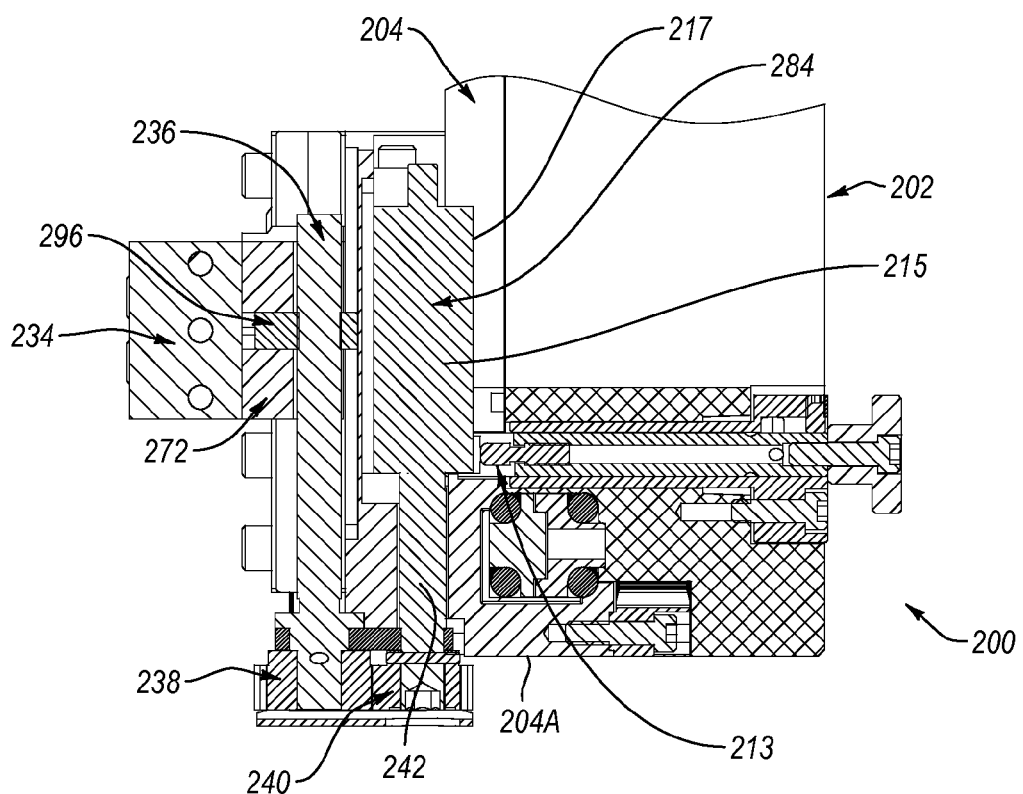
FIG. 11 is a partial cross-sectional view of a pipe lathe showing the tool feed system of a tool module according to another embodiment.

A second exemplary embodiment of a rotating machining device comprising a pipe lathe 200 is shown in FIGS. 10 and 11. The pipe lathe 200 can include a support housing 202 and a headstock 304 rotatably mounted to the support housing 202. It will be appreciated that the support housing 202 and the headstock 204 can be similar to and can include many of the same or similar features as the support housing 102 and the headstock 104 described above.

One or more tool modules 228 can be mounted on the front side of the headstock 204. At least one of the tool modules 228 includes a tool feed system 281. As seen, the tool feed system 281 can be similar to the tool feed system 181 except that the tool feed system 281 can have a feed mechanism comprising a tripper sprocket 284 integral to the shaft portion 203 of a tripper shaft 242. The tripper sprocket 284 can comprise a plurality of longitudinal grooves forming a plurality of teeth 215 extending along the shaft portion 203 that define a star-like cross-sectional shape of the shaft portion 203. The tripper shaft 242 is arranged such that every time a tripper pin 213 of a tripper assembly 205 strikes the shaft portion 203 the tripper shaft 242 rotates one tooth 215.

A recess 217 on the support housing 202 (shown in FIG. 11) can be arranged to accommodate at least a portion of the teeth 215 of the tripper shaft 242. The contact point between the tripper pin 213 and the tripper sprocket 284 or the shaft portion 203 can be maintained in the recess 217 even as the tripper shaft 242 is moved up and down with radial adjustments of the tool module 228. In contrast to conventional pipe lathes, the position of the contact point between the tripper pin 213 and the tripper shaft 242 can be within the envelope of the pipe lathe 200 or radially inside of the outer diameter 204A of the headstock 204, eliminating or limiting a dangerous pinch point.

Further, the location of the collision point between the tripper sprocket 284 and the tripper pin 213 can be repositioned relative to the tool module 228 rather than being fixed relative to the tool module as in the prior art, facilitating adjustment of the collision point to better protect an operator from a pinch point associated with the collision point. It will be appreciated that the shaft portion 203 of the tripper shaft 242 can include any configuration suitable to rotate the tripper shaft 242 at least a fraction of a turn when the shaft portion 203 strikes the tripper pin 213.

In operation, upon each complete revolution of the tool module 228, the tripper pin 213 engages a tooth 215 on the shaft portion 203 of the tripper shaft 242 within the recess 217 to rotate tripper shaft 242 a fraction of a turn. The tripper pin 213 can strike the tripper shaft 242 inside of the recess 217 so the injury risk from the pinch point associated with the interaction between the tripper pin 213 and the tripper shaft 242 is eliminated or limited. The risk or threat of an operator getting a hand or finger injured at the contact point of the tripper pin 213 and the tripper shaft 242 is removed.

The tripper shaft 242 can be attached to a second connecting gear 240 so rotation of the tripper shaft 242 causes rotation of the second connecting gear 240. The second connecting gear 240 meshes with a first connecting gear 238 so rotation of the second connecting gear 240 causes rotation of the first connecting gear 238. The first connecting gear 238 can be attached to a feed screw 236 so rotation of the first connecting gear 238 causes rotation of the feed screw 236.

The feed screw 236 can be threadedly attached to a feed nut 296 so rotation of the feed screw 236 causes the feed nut 296 to advance up and down along the feed screw 236. The interaction between the feed screw 236 and the feed nut 296 can be below a base member 272. A potentially dangerous pinch point between the feed screw 236 and the feed nut 296 is eliminated or limited. The feed nut 296 is operatively coupled to a tool holder 234 so rotation of the feed screw 236 results in radial movement (e.g., up and down translation) of the tool holder 234. The tool feed system 281 can be substantially free of potentially dangerous pinch points.

Figure 12:
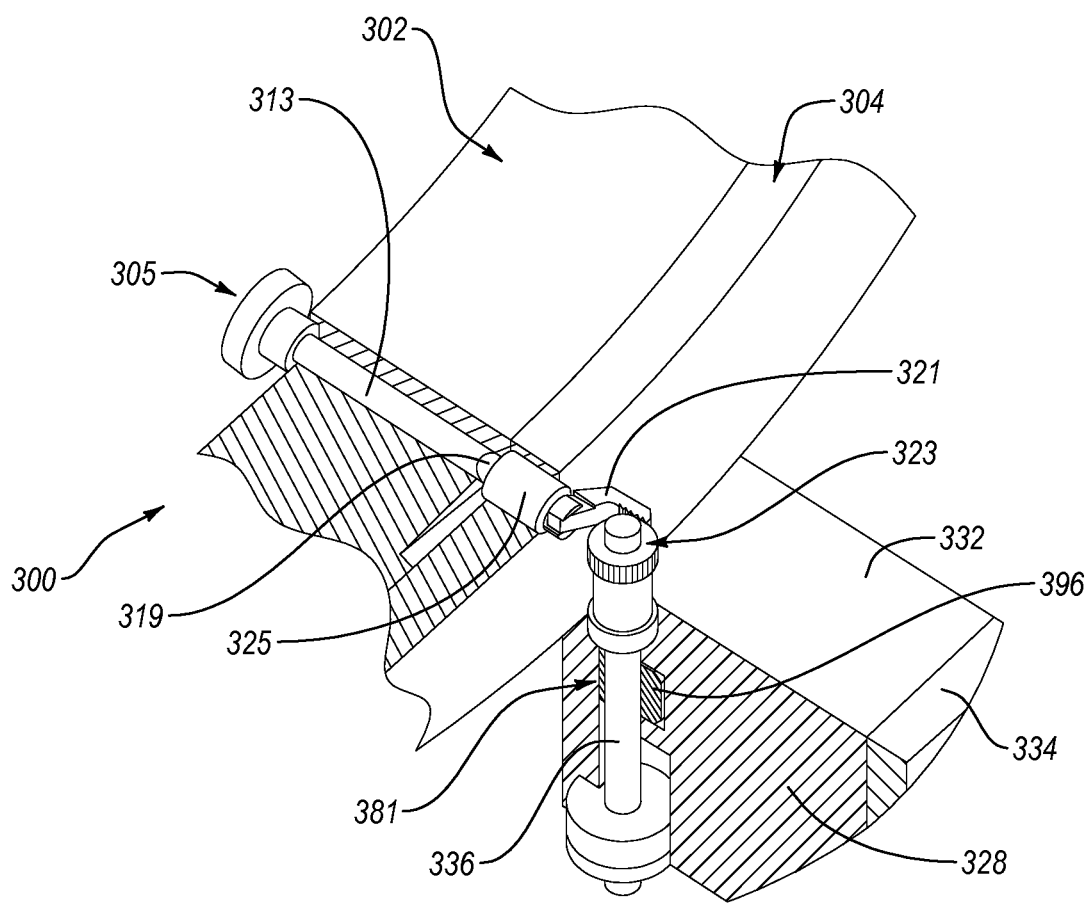
FIG. 12 is a partial cross-sectional view of a pipe lathe showing the tool feed system of a tool module according to another embodiment.

A third exemplary embodiment of a rotating machining device comprising a pipe lathe 300 is shown in FIG. 12. The pipe lathe 300 can include a support housing 302 and a headstock 304 rotatably mounted to the support housing 302. It will be appreciated that the support housing 302 and the headstock 304 can be similar to and can include many of the same or similar features as the support housing 102 and the headstock 104 described above.

One or more tool modules 328 can be mounted on a front side of the headstock 304. At least one of the tool modules 328 can be similar to the tool module 128 except that the tool module 328 includes a tool feed system 381 having a pawl and ratchet wheel configured to interact one with another. More particularly, the tool module 328 can include a housing 325 mounted within a bore in a headstock 304 of the pipe lathe 300. A feed mechanism comprising a pawl arm 319 can be slidably positioned within a bore extending through the housing 325 of the pipe lathe 300. The pawl arm 319 can be movable between a resting position and an extended position, wherein the pawl arm 319 is translated toward a tool block 332.

The pawl arm 319 can include a tripper pin return spring or resilient member that biases the pawl arm 319 toward the resting position. A pawl 321 including a plurality of teeth can be pivotally attached to the pawl arm 319. A ratchet wheel 323 including a plurality of teeth can be attached to a feed screw 336. A cam mechanism can be arranged such that linear movement of the pawl arm 319 causes pivotal movement of the pawl 321 between a resting position and a driving position, wherein the pawl arm 319 pivots toward the ratchet wheel 323 and engages the ratchet wheel 323 to rotate the ratchet wheel 323 a fraction of a turn.

The pawl 321 can include a pawl return spring or resilient member that biases the pawl toward the resting position. A tripper pin assembly 305 can be mounted in a bore in the support housing 302. The tripper pin assembly 305 can include a tripper pin 313 including an angled end portion.

In operation, upon each complete revolution of the tool module 328, the angled end portion of the tripper pin 313 strikes an angled end portion of the pawl arm 319 to move the pawl arm 319 from the resting position to the extended position. The collision or contact point between the tripper pin 313 and the pawl arm 319 can be located internal to the pipe lathe 300, which enhances safety by limiting or eliminating pinch points between the tripper pin 313 and the pawl arm 319. Movement of the pawl arm 319 to the extended position causes the pawl 321 to pivot from the resting position of the pawl 321 to the driving position.

In the driving position, the teeth of the pawl 321 mesh with the teeth on the ratchet wheel 323 to cause rotation of the ratchet wheel 223. The feed screw 336 can be attached to the ratchet wheel 323 so rotation of the ratchet wheel 323 causes rotation of the feed screw 336.

The feed screw 336 can be threadedly attached to the feed nut 396 so rotation of the feed screw 336 causes the feed nut 396 to advance up and down along the feed screw 336. The interaction between the feed screw 336 and the feed nut 396 can be positioned under the tool module 328, enhancing safety because a potentially dangerous pinch point between the feed screw 336 and the feed nut 396 is eliminated or limited. An operator is less likely to injure a hand or fingers.

The feed nut 396 can be operatively coupled to a tool holder 334 so rotation of the feed screw 336 results in radial movement of a tool bit carried by the tool holder 334. The movement of the tool holder 334 moves the tool bit (not shown) radially deeper into the work piece about which the tool bit is orbiting. The tripper pin 313 can be provided with a fixed impact or contact point between the pawl arm 319 and the tripper pin 313 such that upon each revolution of the tool module 328, the tripper pin 313 engages the angled end portion of the pawl arm 319 to move the pawl arm 319 to the extended position, causing movement of the pawl 321 from the resting position to the driving position to rotate the feed screw 336 a fraction of a turn.

Once the tripper pin 313 disengages from the pawl arm 319, the tripper pin return spring can bias the pawl arm 319 back to the resting position of the pawl arm 319. Movement of the pawl arm 319 to the resting position can also allow the pawl return spring to then bias the pawl 321 back to the resting position of the pawl 321.

The teeth on the ratchet wheel 323 can extend longitudinally along a portion of the feed screw 336. The ratchet wheel 323 may include a plurality of rows of teeth or any other suitable configuration of teeth. The teeth of the pawl 321 can mesh with the teeth of the ratchet wheel 323 at different positions depending on how or where the block member 332 is mounted on the headstock 304. The position of the ratchet wheel 323 can be adjusted radially with the block member 332 relative to a fixed position of the tripper pin 313. Further, the interaction between the pawl 321 and the ratchet wheel 323 can be positioned under the tool module 328, enhancing safety by limiting or eliminating pinch points that might injure an operator's hand and/or fingers.

A fourth exemplary embodiment of a rotating machining device comprising a pipe lathe 400 is shown in FIGS. 13-19. The pipe lathe 400 can include a support housing 402, a headstock 404, one or more bearing assemblies that rotatably mount the headstock 404 to the support housing 402. Both the support housing 402 and the headstock 404 can be segmented and arranged to be coupled together to form a complete assembly around a work piece to be machined.

For proper centering, a plurality of spacers 420 can be positioned about the interior wall surface of the support housing 402. One or more jack screws 420A can extend adially through the headstock 404 and support housing 402. The jack screws 420A can help stabilize the work piece and react torque from the pipe lathe 400 to the work piece. It will be appreciated that the support housing 402 and the headstock 404 can be similar to and can include many of the same or similar features as the support housing 102 and the headstock 104 described above.

Figure 13:
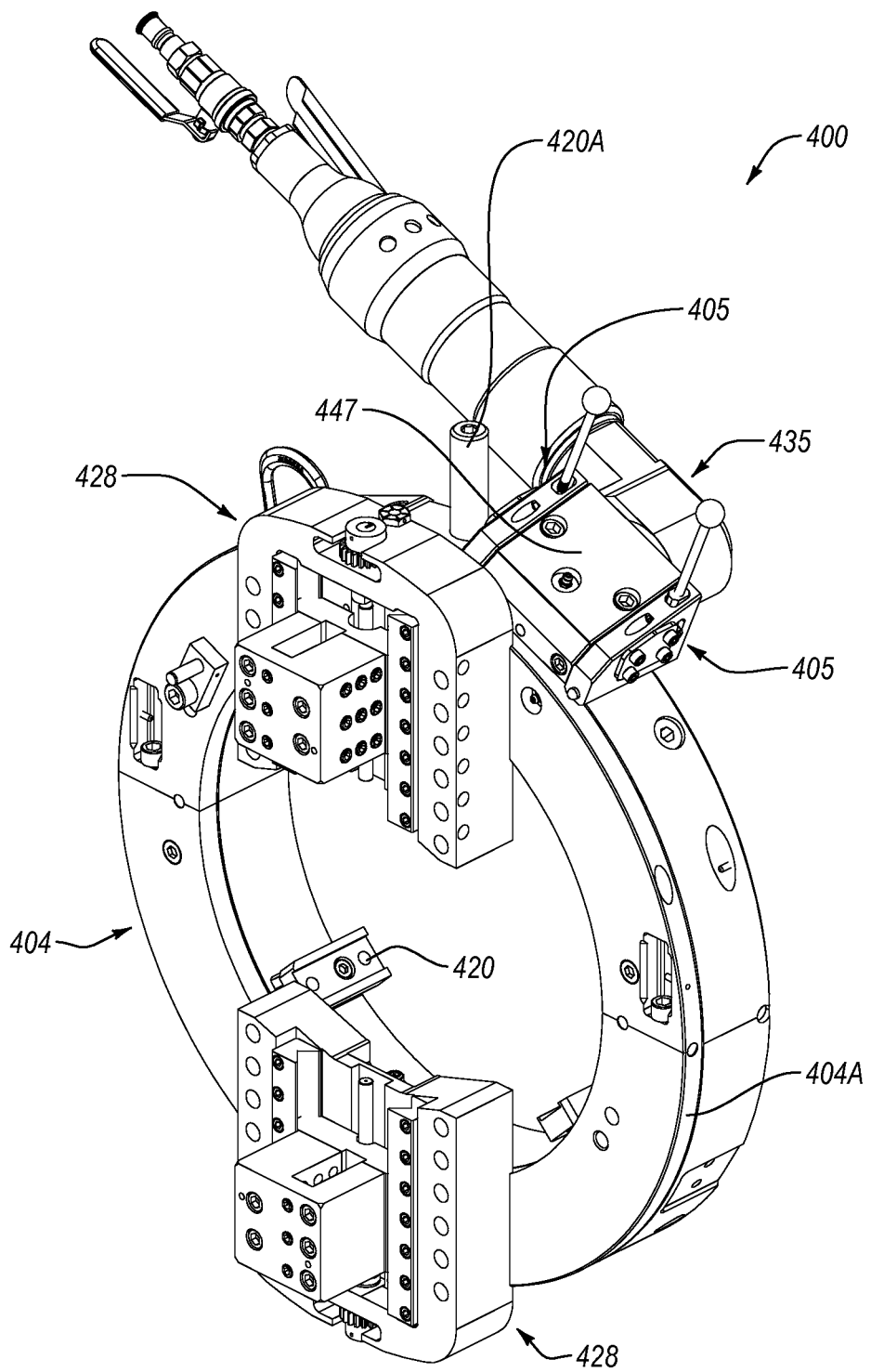
FIG. 13 is a front isometric view of a pipe lathe according to another embodiment.

A drive module 435 and a drive gear housing or gear box 447 can be operatively connected to the headstock 404 to rotate the headstock 404. The drive module 435 and the gear box 447 can have many of the same or similar features as the drive module 135 and the gear box 147 except that the gear box 447 can be mounted on the outer radial surface of the support housing 402. As seen in FIG. 13, the gear box 447 can have a generally low-profile shape such as, but not limited to, a generally tapered or wedge-like shape that tapers toward the headstock 404. This has the effect of reducing the overall profile or envelope of the gear box 447, which reduces a pinch point described below.

Figure 14:
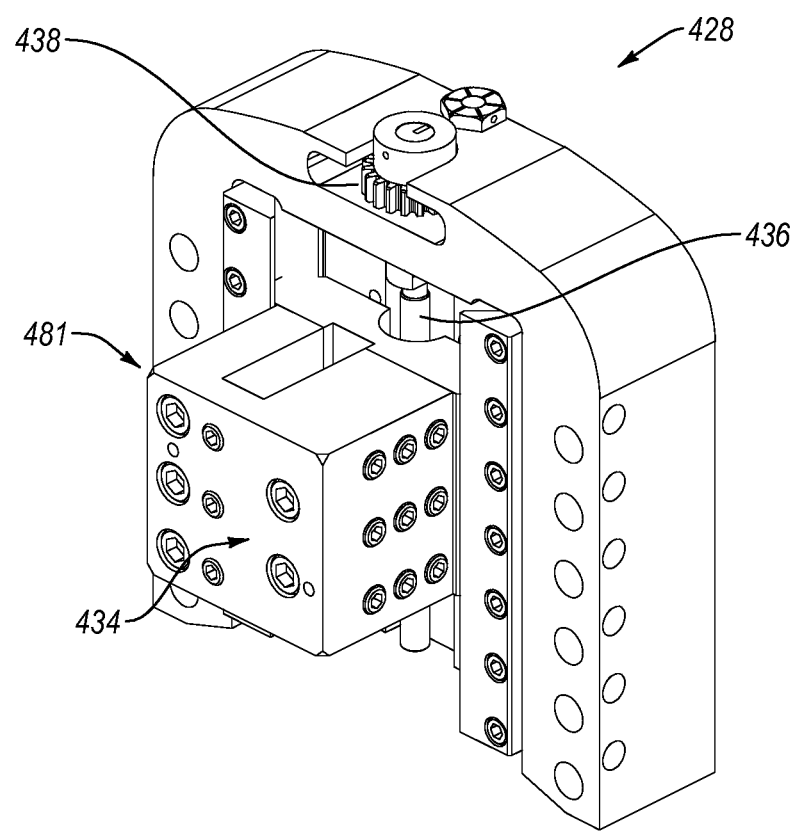
FIG. 14 is a front isometric view of a tool module removed from the pipe lathe in FIG. 13.
Figure 15:
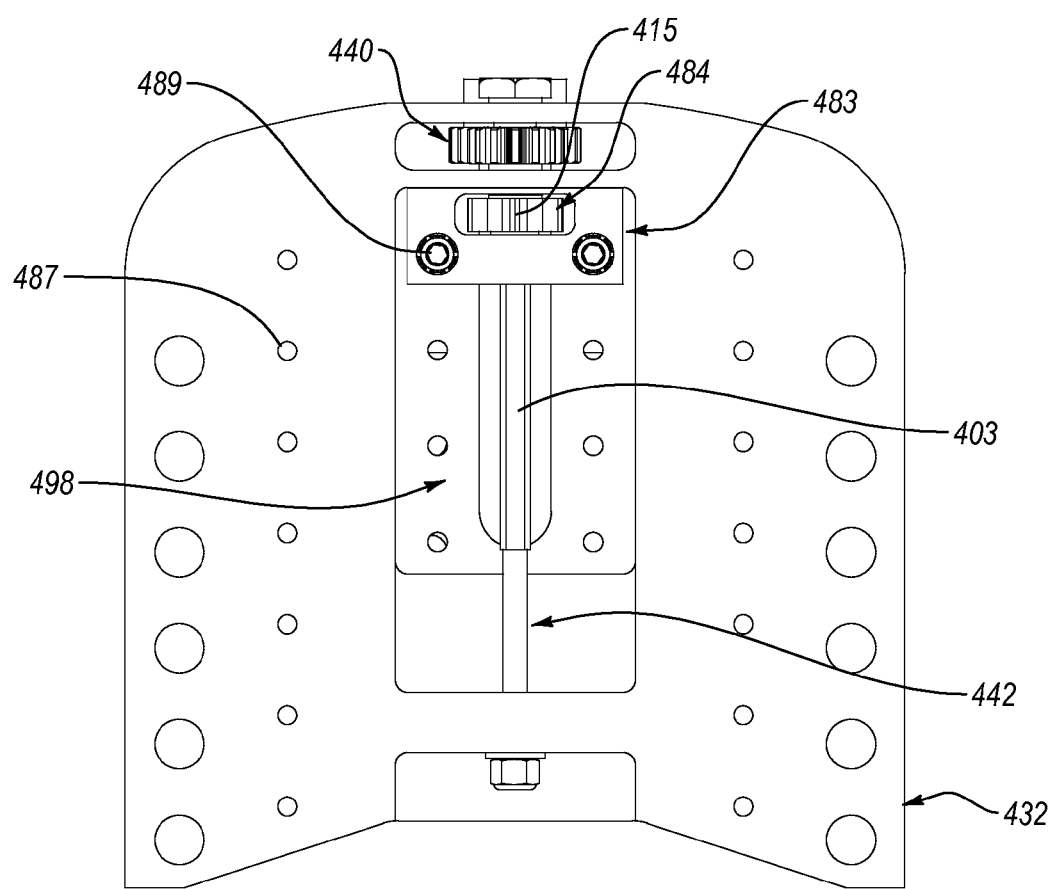
FIG. 15 is a back view of the tool module in FIG. 14.

One or more tool modules 428 can be mounted on the front side of the headstock 404. Referring to FIGS. 14 and 15, at least one of the tool modules 428 can include a tool feed system 481. It will be appreciated that the tool feed system 481 can be similar to the tool feed system 181. A feed mechanism comprising a tripper sprocket 484 (shown in FIG. 15) can include teeth 415 cooperating with a fixed tripper pin to cause advancement of a tool holder 434 (shown in FIG. 14) of the tool module 428 towards or away from the surface of the work piece when the headstock 404 is rotated relative to the support housing 402.

A bore in the tripper sprocket 484 can be arranged to substantially match the shape of at least a portion of a shaft portion 403 of a tripper shaft 442 such that the bore of the tripper sprocket 484 can mate with the shaft portion 403 and rotate the tripper shaft 442 when the tripper sprocket 484 rotates. The tripper sprocket 484 can slide on the shaft portion 403 such that the position of the tripper sprocket 484 along the shaft portion 403 can be adjustable.

The tripper shaft 442 can be attached to a block member 432 and interact with a second connecting gear 440 so rotation of the tripper shaft 442 causes rotation of the second connecting gear 440. The second connecting gear 440 meshes with a first connecting gear 438 (shown in FIG. 14) so rotation of the second connecting gear 440 causes rotation of the first connecting gear 438. The first connecting gear 438 can be attached to a feed screw 436 so rotation of the first connecting gear 438 causes rotation of the feed screw 436.

The feed screw 436 can be threadedly attached to a feed nut (not shown in FIG. 14) so rotation of the feed screw 436 causes the feed nut to advance up and down along the feed screw 436. The interaction between the feed screw 436 and the feed nut can be below a base member 472, eliminating or limiting a potentially dangerous pinch point between the feed screw 436 and the feed nut. The feed nut can be operatively coupled to a tool holder 434 so rotation of the feed screw 436 results in radial movement (e.g., up and down translation) of the tool holder 434.

Referring to FIG. 15, a sprocket support bracket 483 can be in a back cavity 498 of the block member 432. The sprocket support bracket 483 can include a generally planar front side and a generally planar back side disposed opposite the front side of the sprocket support bracket 483. The front side of the sprocket support bracket 483 can face the back side a block member 432. The sprocket support bracket 483 can include a slot 485 that traverses the shaft portion 403 of the tripper shaft 442.

The slot 485 can be arranged to at least partially receive the tripper sprocket 484 such that the sprocket support bracket 483 can support and/or carry the tripper sprocket 484. It will be appreciated that the sprocket support bracket 483 can exhibit any suitable configuration.

The sprocket support bracket 483 and the block member 432 can include a plurality of apertures 487 for receiving a plurality of fasteners 489 to fasten the sprocket support bracket 483 to the block member 432. The apertures 487 can be patterned such that the radial position of the sprocket support bracket 483 including the tripper sprocket can be adjusted by inserting fasteners 489 in different ones of the apertures 487. This allows the sprocket support bracket 483 to selectively position the tripper sprocket 484 at various intervals along the axis of the shaft portion 403 depending on the mounted position of the tool module 428 on the headstock 404.

As the tool module 428 is repositioned for different work piece sizes, the sprocket support bracket 483 and the tripper sprocket 484 can be repositioned along the shaft portion 403 such that the tripper sprocket 484 can remain closely adjacent to the outer diameter 404A (shown in FIG. 13) of the headstock 404. Further, the location of a collision point between the tripper sprocket and a tripper pin described below can be repositioned relative to the tool module 428 rather than being fixed relative to the tool module as in the prior art, facilitating adjustment of the collision point to better protect an operator from a pinch point associated with the collision point. It will be appreciated that the sprocket support bracket 483 and/or the block member 432 can include any suitable number and/or pattern of apertures 487.

As seen in FIG. 13, the tool feed system 481 can include one or more tripper pin assemblies 405 interacting with the tripper sprocket 484. The one or more tripper pin assemblies 405 can include a pair of tripper pin assemblies mounted to the gear box 447. Alternatively, the one or more tripper pin assemblies 405 can include a single tripper pin assembly 405 mounted on one side of the gear box 447.

Figure 16:
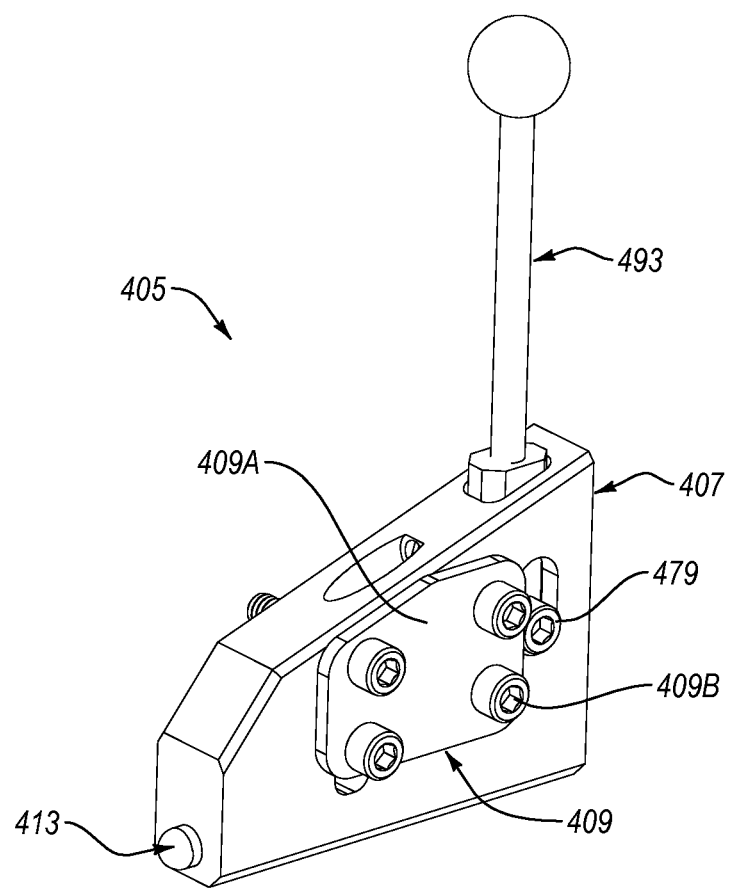
FIG. 16 is a front isometric view of a tripper pin assembly removed from the pipe lathe in FIG. 13.
Figure 17:
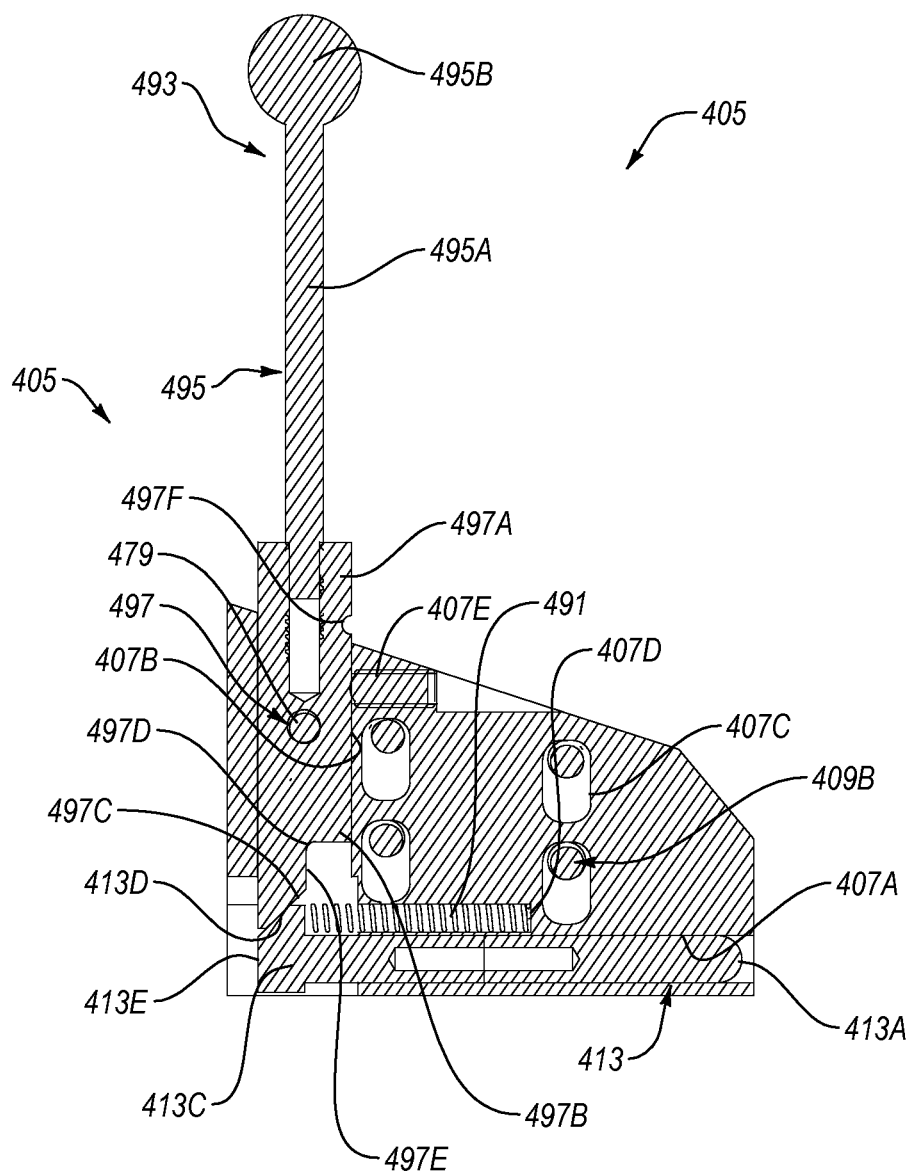
FIG. 17 is a cross-sectional view of the tripper pin assembly in FIG. 16.
Figure 18:
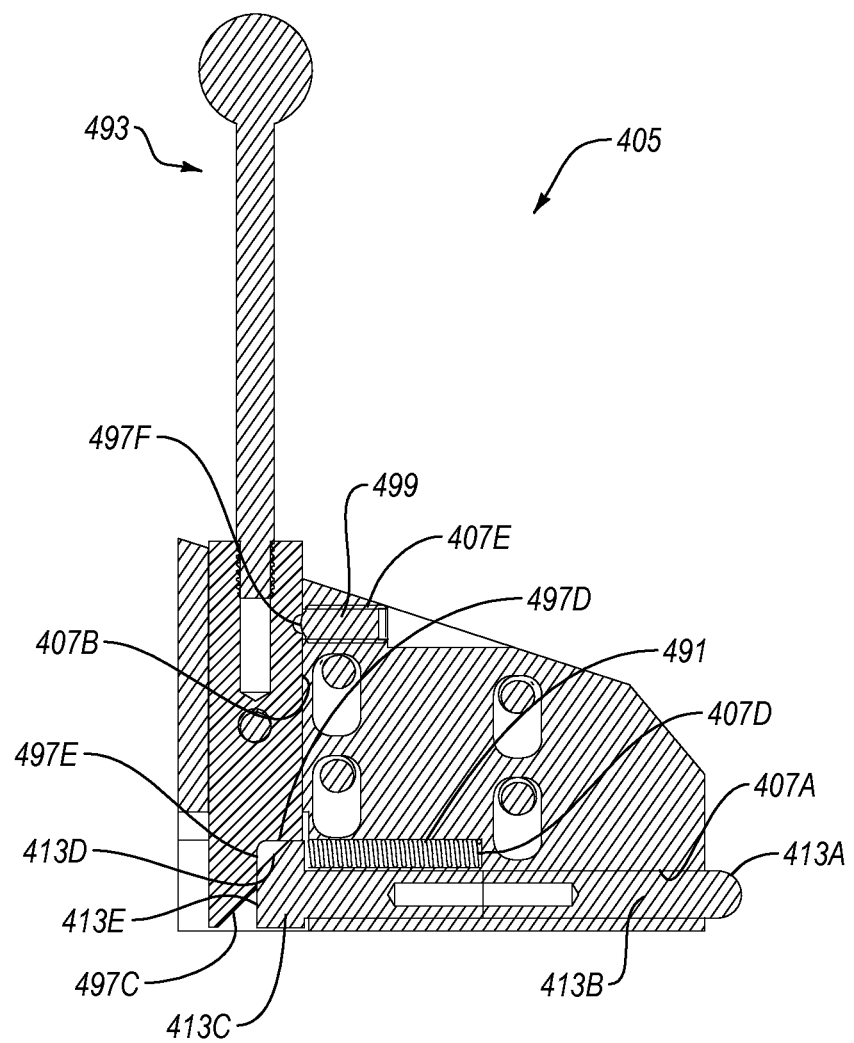
FIG. 18 is another cross-sectional view of the tripper pin assembly in FIG. 16.

FIGS. 16-18 illustrate a tripper pin assembly 405 removed from the gear box 447 for ease of reference. The tripper pin assembly 405 can include a tripper housing 407 having a mounting portion 409 and a tripper pin 413 situated within the tripper housing 407.

A first elongated bore 407A can extend between an inner radial side of the tripper housing 407 and a location within the tripper housing 407. A second elongated bore 407B can extend between a top side of the tripper housing and a bottom side or a location within the tripper housing 407. The second bore 407B can intersect the first bore 407A.

Like the tripper pin 113, the tripper pin 413 can provide a fixed impact or contact point between the tripper sprocket 484 and the tripper pin 413 such that upon each complete revolution of the tool module 428, the tripper pin 413 engages a tooth on the tripper sprocket 484 to rotate the tripper sprocket 484 a fraction of a turn, causing rotation of the tripper shaft 442.

As best seen in FIGS. 16 and 17, the mounting portion 409 of the tripper pin assembly 405 can include a plate 409A and a plurality of fasteners 409B extending through throughholes 407C formed in the tripper housing 407. The throughholes 407C can be elongated slots such that the plate 409A and fasteners 409B can move relative to the tripper housing 407, providing at least some degree of adjustability to the mounting plate relative to the tripper housing 407.

The side surface of the gear box 447 can include a plurality of apertures arranged for receiving the fasteners 409B to fasten the tripper housing 407 between the plate 409A and the side surface of the gear box 447, which fastens the tripper pin assembly 405 to the gear box 447. The mounting portion 409 can clamp the tripper housing 407 between the plate 409A and the side surface of the gear box 447.

As seen in FIGS. 17 and 18, the tripper pin 413 can be movably between an engaged position, wherein a free end portion 413A of the tripper pin 413 extends out of the tripper housing 407, a disengaged position, wherein the free end portion 413A of the tripper pin 413 is substantially received within the first bore 407A of the tripper housing 407.

The tripper pin 413 can have any suitable configuration. The tripper pin 413 can include a body portion 413B including the free end portion 413A and a head portion 413C opposite the free end portion 413A. The head portion 413C can have a diameter that is larger than a diameter of the body portion 413B. The head portion 413C can include a sliding contact surface 413D interacting with a corresponding contact area of an actuator described below. The sliding contact surface 413D can have any suitable configuration. For instance, the sliding contact surface 413D can be angled, curved, planar, combinations thereof, or may exhibit other suitable configurations.

A tripper pin return resilient member or spring 491 can be positioned in a recessed portion 407D of the first bore 407A. The tripper pin return spring 491 can be between a bearing surface formed on the inner radial side of the head portion 413C of the tripper pin 413 and a shoulder formed by the recessed portion 407D. The tripper pin return spring 491 may bias the tripper pin 413 toward the disengaged position.

An actuator 493 can be movably positioned within the second bore 407B of the tripper housing 407. The actuator 493 can include a lever portion 495 and an actuating portion 497. The lever portion 495 can have any suitable configuration. For instance, the lever portion 495 can include a shaft portion 495A attached to the actuating portion 497 and a knob 495B attached to the shaft portion 495A facilitating manipulation of the actuator 493.

The actuating portion 497 can include a first end portion 497A arranged for attachment to the lever portion 495 and a second end portion 497B. The second end portion 497B can form a corresponding sliding contact surface 497C interacting with the sliding contract surface 413D of the tripper pin 413. More particularly, the corresponding sliding contact surface 497C can be arranged such that as the actuator 493 moves toward the tripper pin 413, the sliding contact between the sliding contact surface areas 413D, 497C pushes the tripper pin 413 toward the engaged position of the tripper pin 413.

The second end portion 497B can include a cutout 497D defining a generally flat surface 497E. The flat surface 497E can engage a corresponding generally flat surface 413E on the outer radial side of the head portion 413C of the tripper pin to maintain the tripper pin 413 in the engaged position after the corresponding sliding contact surface 497C has slid past the sliding contact surface 413D on the tripper pin 413. The actuating portion 497 can include a retaining member 479 retaining the actuator 493 in the second bore 407B of the tripper housing 407.

Similar to the tripper pin 413, the actuator 493 can be movable between an engaged position, wherein at least some of the second end portion 497B of the actuating portion 497 extends across the first bore 407A and moves the tripper pin 413 toward its engaged position, and a disengaged position, wherein the second end portion of the actuating portion 497B does not extend across the first bore 407A of the tripper housing 407.

The operation of the actuator 493 will now be described according to an embodiment. Downward movement of the lever portion 495 toward the tripper pin 413 can move the actuator toward the engaged position, which causes the tripper pin 413 to move into the engaged position of the tripper pin 413 such that the free end portion 413D extends out of the first bore 407A of the tripper housing 407.

In the engaged position of the tripper pin 413, the interaction between the flat surface 497E and the corresponding flat surface 413E on the outer radial side of the head portion 413C of the tripper pin after the corresponding sliding contact surface 497C has slid past the sliding contact surface 413D on the tripper pin 413 can help maintain the tripper pin 413 in the engaged position.

Optionally, the tripper pin assembly 405 can include a locking member 499 positionable in a third bore 407E of the tripper housing 407. The locking member 499 can be arranged to selectively engage a locking space 497F formed on the actuating portion 497 when the actuator is in the engaged position. This can help lock the actuator 493 in the engaged position, which can help lock the tripper pin 413 in the engaged position of the tripper pin 413. The locking member 499 can comprise a locking screw, locking latch, or any other suitable locking member.

Upward movement of lever portion 495 of the actuator 493 away from the tripper pin 413 moves the actuator 493 toward the disengaged position. With the actuator 493 in the disengaged position, the tripper pin return spring 491 can automatically bias the tripper pin 413 into the disengaged position.

Figure 19:
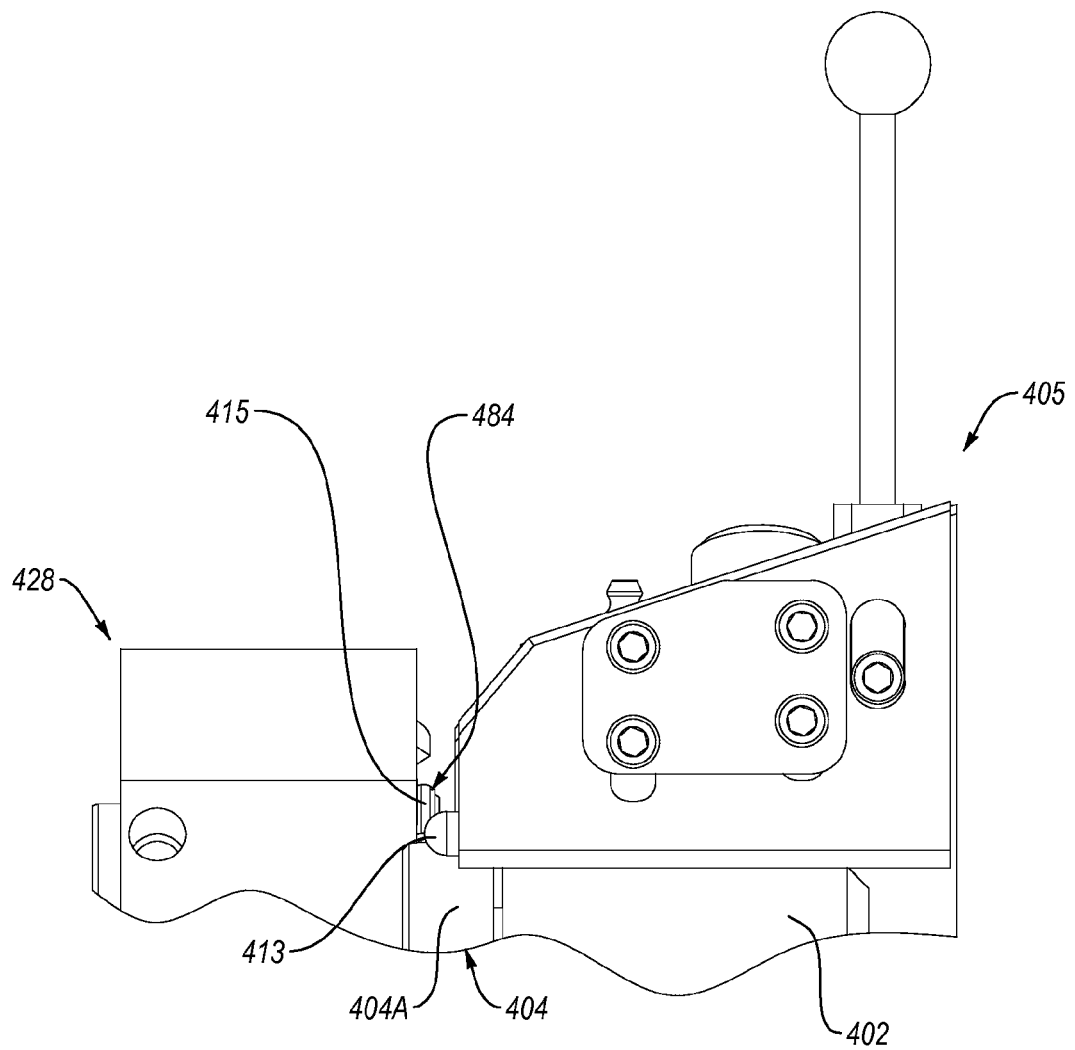
FIG. 19 is a detailed view of the pipe lathe in FIG. 13 showing the tool feed system of the tool module.

As seen in FIG. 19, with the tripper pin assembly 405 mounted to the side surface of the gear box 447 (shown in FIG. 13) and in the engaged position, the tripper pin 413 can be positioned and configured to actuate the tripper sprocket 484 or another suitable feed mechanism substantially adjacent the envelope or outer diameter 404A of the headstock 404. In operation, upon each complete revolution of the tool module 428, the tripper pin 413 can engage a tooth 415 on the tripper sprocket 484 to rotate the tripper shaft 442 a fraction of a turn.

Because the tripper pin assembly 405 is mounted on the gear box 447, the tripper pin 413 can strike the tripper sprocket 484 substantially adjacent the outer diameter 404A of the headstock 404. More particularly, the contact point between the tripper pin 413 and the tripper sprocket 484 can be closely adjacent to the outer diameter 404A of the headstock 404, reducing the risk or threat of an operator getting a hand or finger injured between the tripper pin and the tripper sprocket 484.

It will be appreciated that since the contact point of the tripper pin 413 and the tripper sprocket 484 is substantially adjacent the outer diameter 404A of the headstock 404 rather than within the headstock 404, the headstock 404 can be arranged without a recess to accommodate a portion of the tripper sprocket 484 and the tripper pin 413. Because the tripper pin assembly 405 is mounted close to the support housing 402 rather than on a radially protruding tower as in the prior art, the risk of an operator being injured by the tripper tower and/or a pinch point radially spaced from the outer diameter of the headstock on the tripper tower is substantially reduced, making the pipe lathe 400 more compact and safer to operate. While shown attached to the gear box 447, it will be appreciated that the one or more tripper pin assemblies 405 can be mounted in any suitable location on the pipe lathe 400.

It will be appreciated that the tool modules and tool feed systems described can be utilized with any suitable rotating machining or cutting device including, but not limited to, lathes, multi-axis spindles, milling machines, and/or boring machines.

While various aspects and embodiments have been disclosed, other aspects and embodiments are contemplated. The aspects and embodiments disclosed are for illustration and are not intended to be limiting. The words "including," "having," and variants thereof (e.g., "includes" and "has") as used, including the claims, shall be open-ended and have the same meaning as the word "comprising" and variants thereof (e.g., "comprise" and "comprises").

The invention claimed is:

1. A rotating machining device for machining a work piece comprising:

a support housing adapted to be mounted on the work piece;

a headstock rotatably mounted on the support housing;

at least one tool module mounted to the headstock and including a tool feed system having a tool holder and a feed mechanism operatively connected to the tool holder; and a tripper pin assembly mounted on the support housing and arranged to collide with the feed mechanism for advancement of the tool holder relative to the work piece, wherein the tripper pin assembly collides with the feed mechanism at a collision point radially positioned inside of an outer diameter of the headstock, the radial position of the collision point being adjustable relative to the at least one tool module such that the collision point is repositionable independent of the at least one tool module.

2. The rotating machining device of claim 1, wherein the headstock defines an annular recess and the collision point is located within the annular recess.

3. The rotating machining device of claim 2, wherein the tripper pin assembly extends axially through the support housing and into the annular recess of the headstock.

4. The rotating machining device of claim 2, wherein the feed mechanism comprises a tripper sprocket operatively connected to a tripper shaft attached to the at least tool module, wherein the tripper sprocket is at least in part situated in the annular recess of the headstock and arranged to interact with the tripper pin assembly.

5. The rotating machining device of claim 1, wherein the position of the feed mechanism is adjustable relative to the at least one tool module.

6. The rotating machining device of claim 1, wherein the feed mechanism comprises a tripper sprocket slidably mounted on a tripper shaft attached to the at least one tool module such that the tripper sprocket slides along the tripper shaft with radial adjustments of the at least one tool module relative to the headstock.

7. The rotating machining device of claim 6, further comprising a bottom support bracket attached to a bottom side of the at least one tool module and arranged to retain the tripper sprocket on the tripper shaft.

8. The rotating machining device of claim 6, wherein the tripper sprocket defines a bore arranged to substantially match a shape of at least a portion of the tripper shaft such that rotation of the tripper sprocket causes rotation of the tripper shaft.

9. The rotating machining device of claim 6, further comprising a sprocket support bracket removably attached to the at least one tool module and arranged to selectively support and position the tripper sprocket at different intervals along an axis of the tripper shaft.

10. The rotating machining device of claim 9, wherein the sprocket support bracket defines a slot arranged to at least partially receive the tripper sprocket such that the sprocket support bracket carries the tripper sprocket in the slot along the axis of the tripper shaft.

11. The rotating machining device of claim 1, wherein the feed mechanism comprises a tripper sprocket including a plurality of elongated teeth formed on a tripper shaft attached to the at least one tool module.

12. The rotating machining device of claim 1, wherein the tool feed system includes:

a feed screw operatively connected to the feed mechanism such that rotation of the feed mechanism results in rotation of the feed screw; and a feed nut operatively connected to the tool holder and arranged to run along the feed screw as the feed screw rotates such that rotation of the feed screw results in radial movement of the tool holder.

13. The rotating machining device of claim 12, wherein the tool holder is attached to a base member arranged to move with the tool holder and the feed nut is at least in part situated within a slot formed in the base member.

14. The rotating machining device of claim 1, further comprising:

a gear ring attached to the headstock; and a drive gear operatively connected to the gear ring and arranged for rotating the gear ring and the headstock during operation of the rotating machining device;

wherein the connection between the gear ring and the drive gear is radially positioned inside of the outer diameter of the headstock.

15. The rotating machining device of claim 14, wherein the headstock defines an annular shoulder and the gear ring is attached to the headstock in the annular shoulder.

16. A tool feed system for use with a rotating machining device having a support housing, a headstock rotatable relative to the support housing, and a tool module mounted to the headstock, the tool feed system comprising:

a tool holder slidably positionable on the tool module;

a feed mechanism operatively connected to the tool holder;

a tripper pin assembly mountable on the support housing and including a tripper element fixedly positioned relative to the support housing and arranged to collide with the feed mechanism for advancement of the tool holder relative to the tool module, wherein the tripper element collides with the feed mechanism at a collision point that is adjustable relative to the tool module such that the collision point is radially repositionable independent of the tool module.

17. The tool feed system of claim 16, wherein the collision point is located within the headstock.

18. The tool feed system of claim 16, wherein the collision point is substantially adjacent an outer diameter of the headstock.

19. A rotating machining device for machining a work piece comprising:

a body including a support housing and a headstock rotatable relative to the support housing;

a tool feed system including a tool module attached to the headstock; and a tripper pin assembly attached to the support housing and arranged to collide with the tool feed system at a collision point located inside or substantially adjacent an outer diameter of the body for advancement of the tool feed system relative to the work piece, wherein the radial position of the collision point is adjustable relative to the tool module such that the collision point is repositionable independent of the tool module.

* * * * *